(12) United States Patent
Schroeder et al.

(10) Patent No.: US 12,530,968 B2
(45) Date of Patent: Jan. 20, 2026

(54) MAP-BASED EMERGENCY CALL MANAGEMENT AND DISPATCH

(71) Applicant: RapidDeploy, Inc., Austin, TX (US)

(72) Inventors: Karl Ulrich Schroeder, Cape Town (ZA); Steven Raucher, Austin, TX (US)

(73) Assignee: RAPID DEPLOY, INC., Austin, TX (US)

( * ) Notice: Subject to any disclaimer, the term of this patent is extended or adjusted under 35 U.S.C. 154(b) by 0 days.

(21) Appl. No.: 17/886,141

(22) Filed: Aug. 11, 2022

(65) Prior Publication Data

US 2023/0049959 A1 Feb. 16, 2023

Related U.S. Application Data

(60) Provisional application No. 63/231,914, filed on Aug. 11, 2021.

(51) Int. Cl.
| | | |
|---|---|---|
| *G08G 1/0969* | (2006.01) | |
| *G06F 3/04842* | (2022.01) | |
| *G06F 3/04845* | (2022.01) | |
| *G06F 3/04847* | (2022.01) | |
| *G08G 1/00* | (2006.01) | |
| *H04M 11/04* | (2006.01) | |

(52) U.S. Cl.
CPC ....... *G08G 1/0969* (2013.01); *G06F 3/04845* (2013.01); *G06F 3/04847* (2013.01); *G08G 1/202* (2013.01); *H04M 11/04* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 9,342,976 B2* | 5/2016 | Pfeffer | G08B 25/016 |
| 10,375,557 B2* | 8/2019 | Newby | H04W 4/021 |
| 11,330,104 B1* | 5/2022 | Pappas | H04L 65/1069 |
| 2007/0103294 A1* | 5/2007 | Bonecutter | G08B 25/10 |
| | | | 340/539.18 |
| 2007/0218869 A1 | 9/2007 | Thijs et al. | |
| 2011/0046920 A1* | 2/2011 | Amis | G08B 25/016 |
| | | | 709/217 |
| 2011/0117878 A1* | 5/2011 | Barash | G16H 40/20 |
| | | | 340/539.12 |

(Continued)

OTHER PUBLICATIONS

International Search Report and Written Opinion issued in PCT/US22/40097 on Oct. 19, 2022; 8 pages.

*Primary Examiner* — Henry Orr

(57) ABSTRACT

An emergency response system provides a map-based interface for a telecommunicator to view information about an incident and coordinate a response to the incident. The emergency response system gathers supplemental data regarding locations and other information that may be relevant in assisting with the incident. The interface may automatically select relevant supplemental information based on the incident and provide this incident-specific information for display on the interface. The user may then select a response on the interface such as a unit to dispatch that the system automatically implements, providing unified information and control for incidents, supplemental information, and incident response.

30 Claims, 16 Drawing Sheets

(56) References Cited

U.S. PATENT DOCUMENTS

| | | | |
|---|---|---|---|
| 2011/0181443 A1* | 7/2011 | Gutierrez | G01C 21/3697 |
| | | | 340/990 |
| 2012/0185559 A1 | 7/2012 | Wesley et al. | |
| 2014/0002241 A1 | 1/2014 | Elghazzawi | |
| 2015/0113426 A1* | 4/2015 | Okubo | H04W 4/90 |
| | | | 715/744 |
| 2016/0100302 A1* | 4/2016 | Barash | H04W 4/023 |
| | | | 455/404.2 |
| 2016/0174027 A1* | 6/2016 | Miasnik | G16H 40/67 |
| | | | 455/404.2 |
| 2017/0180966 A1 | 6/2017 | Piett et al. | |
| 2020/0175767 A1* | 6/2020 | Stivi | G08B 25/10 |
| 2020/0314623 A1* | 10/2020 | Pellegrini | H04W 4/021 |
| 2022/0359064 A1* | 11/2022 | Pierson | G08B 25/006 |

* cited by examiner

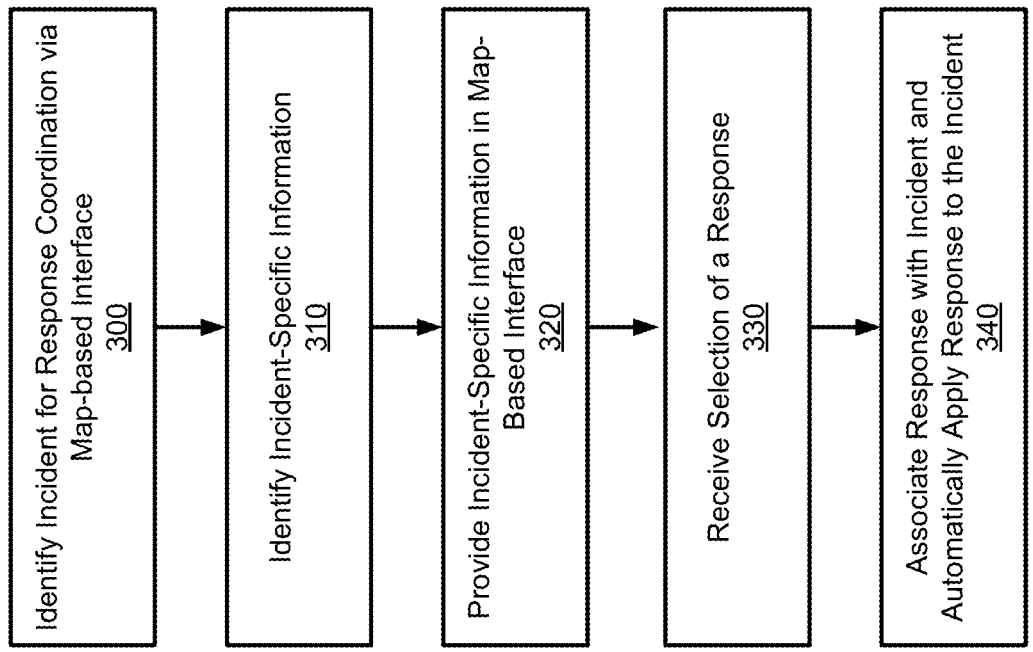

MAP-BASED EMERGENCY CALL MANAGEMENT AND DISPATCH

CROSS REFERENCE TO RELATED APPLICATION

This application claims the benefit of priority to U.S. Provisional Application No. 63/231,914, filed Aug. 11, 2021, the disclosure of which is hereby incorporated by reference herein in its entirety for all purposes.

BACKGROUND

When a person in an emergency situation places an emergency call (e.g., a 9-1-1-call), it is routed to a Public Safety Answering Point (PSAP) and answered by a telecommunicator. Telecommunicators utilize software, such as emergency call-taking and computer-aided dispatch (CAD) applications, which provide information about emergency calls and first responders (e.g., police, fire, and medical responders) to the telecommunicators. CAD applications enable telecommunicators to connect to first responders (e.g., police, fire, and/or emergency medical services (EMS)) and dispatch first responders to the locations of emergencies.

In many PSAPs, particularly larger PSAPs with multiple telecommunicators, the telecommunicators are divided into two roles: (1) call-takers who receive emergency and administrative calls and create an incident for dispatch, and (2) dispatchers who assign vehicles and units to an incident based on different factors, such as proximity, availability, and capabilities of the vehicles/units. In current CAD programs, call-taking and dispatching activities are primarily managed via text-based interfaces. For example, caller information and vehicle/unit information are typically presented in grids and tables, and much of the user interaction is driven through keyboard shortcuts/hotkeys, command line interfaces, and/or text-based menus. For example, many CAD programs require a dispatcher to assign and dispatch units to an incident via a text-based command line using very strict syntax, or by manually selecting a unit from a separate list of available resources and assigning the unit to an incident (e.g., via a right-click menu). This process is cumbersome and makes it difficult as new telecommunicators are required to learn the keyboard shortcuts and/or command line syntax. Furthermore, by not conveying the information spatially (e.g., with respect to geographic locations), text-based interfaces deprive dispatchers of key pieces of situational information, which can result in non-ideal dispatch decisions.

Existing mapping tools are separate from the text-based call-taking and dispatch interfaces, and generally lack the information and capability to dispatch or otherwise determine and apply emergency response that is in the text-based interfaces. For example, call handling software that interfaces with call management hardware (e.g., customer premise equipment (CPE)) that receives incoming calls may generate a map with caller locations, but this generated map typically does not have access to responder data and does not display responder locations or information on the same map. A map provided by the CAD software may show the location of responders and emergencies the responders have been dispatched to, but telecommunicators cannot take direct action (e.g., assigning a unit) directly from the map. Furthermore, the CAD software often does not have access to and does not display incoming call data (e.g., caller location data). In addition, these maps do not integrate contextual or other supplemental information, such as surrounding hazards (e.g., road closures or other events that may impact routing) on the map. The disparate sources of information and inability to smoothly integrate these sources/types of information and emergency responses have a negative effect on telecommunicators' situation awareness, as it is up to the individual emergency telecommunicator to combine and synthesize the information and translate between a text-based environment (grids) and a spatial environment (maps).

BRIEF DESCRIPTION OF THE DRAWINGS

FIG. 3 shows an example flowchart for providing a map-based user interface for providing a response to an incident, according to one embodiment.

Figure 1:
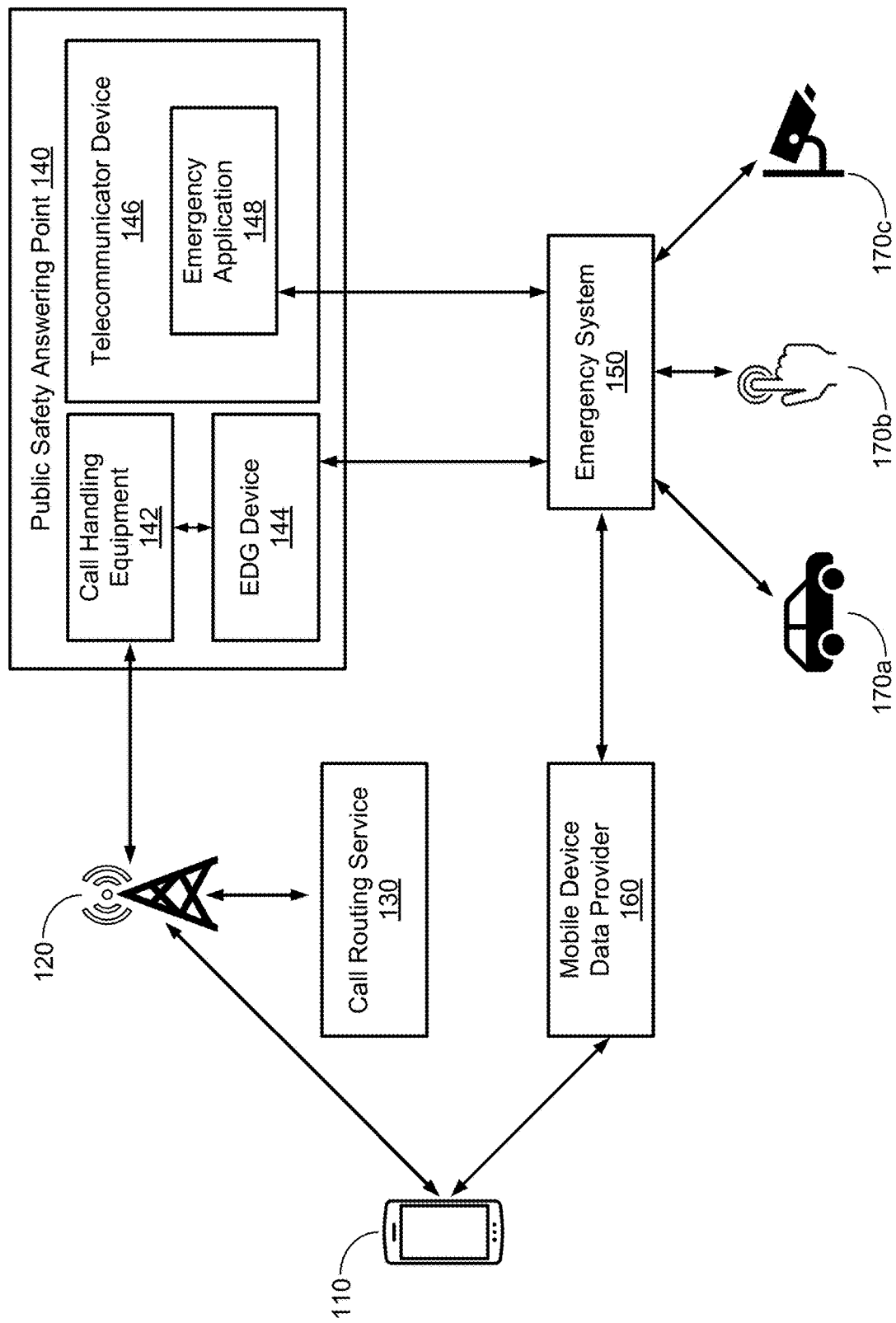
FIG. 1 is an environment of a system for handling and displaying data associated with incidents, according to one embodiment.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An emergency response system provides a data-rich map that enables telecommunicators to handle emergency calls and provide an emergency response via the map-based interface. For example, the map-based interface may be used to assign emergency response units to an incident. An emergency CAD system (also referred to as a "CAD system" or "emergency system") receives data describing emergency calls (e.g., from a CPE), including caller location, and data describing emergency response units, including unit type, location, and availability. The CAD system may be a cloud-based emergency software system that assists in emergency response and deployment for several jurisdictions and/or PSAPs. The CAD system may receive additional data from other various data sources, e.g., supplemental caller data (e.g., location from supplemental location providers, health information, etc.), supplemental incident information (e.g., alarm data, car crash data, etc.), data about incidents handled by the PSAP, or other nearby PSAPs (e.g., incidents handled by neighboring PSAPs, or by PSAPs that handle different types of emergency calls); contextual information (e.g., real-time traffic, weather, road closures, etc.); data describing known risks (e.g., hazardous materials, information about persons with a history of violent response, etc.), emergency alert data broadcast from government agencies (e.g., Integrated Public Alert & Warning System (IPAWS) data from the Federal Emergency Management Agency (FEMA)), and the like.

The CAD system integrates the available information to provide a map-based interface. The map-based interface may intelligently surface and display relevant information for a particular incident (as opposed to displaying all available information), e.g., surfacing a subset of the units based on type (e.g., police units for a police incident, fire/EMS units for a medical incident, etc.) and/or based on proximity (e.g., surfacing the 5 nearest fire/EMS units for a medical incident). As another example, the map-based interface may display traffic or other roadway information only in a vicinity around an incident and/or unit, or along a route between the unit and the incident location. The map-based interface may further enable telecommunicators to control the display of information through layers, e.g., various selectable layers provide different types of information. As another example, certain information may be displayed through pop-up menus or other interfaces, e.g., information panels along an edge of the map.

The map-based interface provides a number of advantages over traditional text-based call-taking and dispatch (CAD) software. In the map-based interface, the map becomes a single source of truth for emergency telecommunicators, rather than a supplemental window that lacks certain critical information. The map-based interface provides a real-time, contextually aware visualization of data in a single window. The map-based interface is a more intuitive interface for controlling, modifying, and managing different pieces of spatial information. In particular, drag-and-drop allows for a more natural interaction paradigm for incoming trainee telecommunicators, reducing training complexity and time. The map-driven interface also obviates the need for telecommunicators to memorize keyboard shortcuts or command line interface commands/syntax, which are challenging for trainee telecommunicators, and for telecommunicators who switch between systems (e.g., after a software upgrade, or after transferring from one PSAP to another PSAP). Furthermore, the intuitive nature of the map-based interface enables outside telecommunicators to immediately assist in an emergency situation, e.g., if a crisis impairs normal PSAP operations (e.g., a power outage or temporary displacement), or when more telecommunicators are needed to respond to an event (e.g., during a large-scale natural disaster).

The map-based interface may also be provided for display on touch-screen interfaces used by mobile users. This provides a benefit for mobile users, e.g., during emergency management, search and rescue, disaster response, and other response types, and allows the mobile users to coordinate emergency response away from a traditional PSAP or CAD software solution. Furthermore, a map-driven interface can enable a reduction in the number of displays required for emergency telecommunications centers or for mobile users. While traditional CAD setups have three or more screens (e.g., screens for incident grid, unit grid, incident details, map, and/or telephony controls), with the map-based interface, a single screen with the map view may be used. This enables a telecommunicator to work on a mobile device or laptop computer, or a simpler desktop computer setup. These and further features and configurations for an emergency response system using a map-based interface are further discussed with respect to the various Figures below.

Example Emergency Call Data Environment

FIG. 1 is an environment of a system for handling and displaying data associated with incidents, according to one embodiment. These incidents may generally represent time-sensitive, urgent, or emergency situations calling for coordinated response by a public safety authority. Such incidents may generally be represented by a call to a public safety number, although incidents may be identified by various means in different embodiments. Incidents, which may also be referred to herein as emergencies, may represent various types of events, such as reports of criminal activity, fires, disasters, dangerous animals or wildlife and other types of time-sensitive events for which information and a coordinated response may be provided. When an incident is identified, it is typically associated with a physical location (which may be defined in any suitable way, such as a specific point location or as one or more geographic regions, e.g., as in a forest fire). The public safety answering point 140 in conjunction with the emergency system 150 may coordinate a response to the incident, which may include dispatching responders to the location of the incident and providing additional support to the responders. Those who may respond to an emergency, such as police officers, firefighters, animal control, etc., may be referred to herein as responders or individually as "units." As such, a "unit" dispatched to an incident may represent a police vehicle with one or more police officers responding to the incident. To improve responses to incidents, the emergency system 150 provides a map-based system for response coordinators (e.g., a telecommunicator operating a telecommunicator device 146) to view information about an incident, supplemental data that may be relevant to the incident, and coordinate a response to the incident directly from the map-based interface.

The environment includes a mobile device 110, a cell tower 120, a call routing service 130, a public safety answering point (PSAP) 140, an emergency system 150, a mobile device data provider 160, and secondary data sources 170a-170c. Only one of the mobile device 110, cell tower 120, call routing service 130, PSAP 140, and mobile device data provider 160 are shown for simplicity. In a working system environment, there may be more of each of these elements.

The mobile device 110 may be a cell phone, a smart phone, a tablet, or another device capable of initiating emergency reporting. The mobile device 110 is a device having a user interface (e.g., a touchscreen, buttons, microphone, speaker, camera, etc.) for interacting with a user and communications circuitry that connects the mobile device 110 to a communications network to initiate an emergency communication, e.g., to place an emergency call or send a text message. In this example, the mobile device 110 connects to a cellular network via the cell tower 120. In other examples, the mobile device 110 may additionally or alternatively connect to an Internet-based network via a wired or wireless connection (e.g., Wi-Fi), or to one or more other types of networks. While a mobile device 110 is shown in FIG. 1, other means of reporting an incident may also be used, such as a traditional wired telephone connection (e.g., a Plain Old Telephone Service ("POTS")) or via a Voice-over-Internet-Protocol (VoIP) call from a fixed location.

The cell tower 120 is one component of a cellular network that enables wireless communication between mobile devices and enables communication between wireless devices (e.g., the mobile device 110) and other networked communications devices or systems (e.g., the PSAP 140). Additional cell towers and other networking equipment are directly or indirectly coupled to the cell tower 120 for routing calls placed by mobile devices 110. When a user of the mobile device 110 makes an emergency call, such as a 9-1-1 call, the cell tower 120, or a network element coupled to the cell tower 120, interacts with a call routing service 130. The call routing service 130 determines an initial location estimate of the mobile device 110 based on the location of the cell tower 120. In some examples, the call routing service 130 may determine the location of the mobile device 110 based on alternative or additional information, such as the location of one or more additional cell towers in range of the mobile device 110, or a location provided by the mobile device 110.

The call routing service 130 routes the emergency call from the mobile device 110 to a particular PSAP 140 based on the initial location estimate. The PSAP 140 may cover a particular geographic region, e.g., a city, a county, a group of counties, a highway system, a park system, etc. The call routing service 130 identifies a PSAP (e.g., PSAP 140) that covers the location estimate of the mobile device 110 by comparing the location estimate of the mobile device 110 to the geographic boundaries associated with a set of PSAPs. The mobile device 110 communicates with telephony equipment in the selected PSAP 140 via the cell tower 120 and additional networking equipment not shown in FIG. 1.

The PSAP 140 is an emergency call handling system. The PSAP 140 includes call handling equipment (CHE) 142, an emergency data gateway (EDG) device 144, and a telecommunicator device 146 executing an emergency application 148. The CHE 142 receives and handles calls from the telephony network, which includes the cell tower 120. The CHE 142 creates a call event for each received call, such as an emergency call from a mobile device 110. The CHE 142 associates call data, such as caller location information, call routing actions, Automatic Call Distribution (ACD) events, and other telemetry data, with the call event. Call data may also include the phone number and contact name of the user of the mobile device 110, class of service, service provider, a time stamp, and other information describing the user, mobile device 110, network, etc. The CHE 142 may output call data in one of a variety of data output formats, such as Automatic Location Information (ALI), Call Detail Record (CDR), or National Emergency Number Association (NENA) i3 Logging.

In the example shown in FIG. 1, an EDG device 144 installed at the PSAP 140 connects to the CHE 142. The EDG device 144 receives the call data from the CHE 142 and parses and formats the call data into a consistent data format. The EDG device 144 connects to an emergency system 150 via a network, such as the Internet, and the EDG device 144 transmits the formatted call data to the emergency system 150 via the network. The use of an EDG device 144 to transfer data from a CHE 142 to a cloud-based emergency system 150 is described in U.S. Pat. No. 10,264,122, incorporated by reference in its entirety. In another example, a central CPE host located outside the PSAP 140 receives call information for a group of PSAPs and distributes the call information to a selected PSAP, e.g., PSAP 140. In this example, a multi-tenant emergency call data relay may capture call data from the central CPE host and transmit the captured call data to the emergency system 150. The use of the data relay, and the data relay in combination with one or more EDG devices, is described in U.S. patent application Ser. No. 17/070,400, incorporated by reference in its entirety.

The PSAP 140 further includes a telecommunicator device 146. In this example, the telecommunicator device 146 is a computer system operated by a telecommunicator on-site at the PSAP 140. In other embodiments, the telecommunicator device 146 is at a different location from the PSAP 140, e.g., at a backup facility, mobile command center, remote worksite, etc. The telecommunicator device 146 includes the hardware and software to display user interfaces, connect to an IP-based network, and detect user input. The telecommunicator device 146 includes an emergency application 148 that allows interaction with the emergency system 150. In one embodiment, the emergency application 148 is a browser that allows a telecommunicator to access a web-based CAD service provided by the emergency system 150. In another embodiment, the emergency application 148 is a dedicated application provided by the emergency system 150 to enable interactions with the emergency system 150. The PSAP 140 may include multiple telecommunicator devices 146, each used by a different telecommunicator. Each telecommunicator device may have an associated position number.

The emergency system 150 assists telecommunicators in responding to emergency calls. The emergency system 150 may be a cloud-based processing system embodied on one or more computing systems that may be remote to the PSAP 140. While the emergency system 150 is shown as being outside the PSAP 140, in other embodiments, some or all of the functions performed by the emergency system 150 and described herein may alternatively be performed by on-site hardware located within a PSAP 140. Detailed functionality of the emergency system 150 is described below.

The emergency system 150 receives the formatted call data generated by the EDG device 144, processes the received formatted call data, and generates user interfaces for display by the emergency application 148. While one PSAP 140 is shown in FIG. 1, as noted above, the environment may include many similar PSAPs, and the emergency system 150 may receive call data from many PSAPs, e.g., from EDG devices 144 installed across many PSAPs. In addition, the emergency system 150 may receive call data from one or more multi-tenant emergency call data relays at one or more central emergency call handling hosts.

The emergency system 150 also receives supplemental data signals from one or more supplemental data sources. The supplemental data sources may be separate from the PSAP 140, and in particular, separate from the CHE 142 and EDG device 144 which provide the call data described above. The supplemental data signals provided by the supplemental data sources include data describing emergencies that reaches the emergency system 150 through one or more alternate pathways. Example supplemental data sources include the mobile device data provider 160 and the secondary data sources 170a-170c shown in FIG. 1. Some or all supplemental data signals may include location information. Some or all supplemental data signals may include contact information, such as a phone number. Some or all supplemental data signals may include alternative or additional data that can be used to correlate the supplemental data signal to an emergency call, such as phone number, name, time stamp, location, etc. Additional and alternative supplemental data that may be included in a supplemental data signal are described below.

In addition to supplemental data signals that may indicate an incident (e.g., additional sources of information that may generate additional emergency incidents for which a response is coordinated), the emergency system 150 may also receive (or otherwise access) supplemental data that may be used or that is relevant to responding to incidents. Such supplemental information may include location information (e.g., of units that may respond to emergencies), mapping, routing, traffic, road hazards, weather, positional information for persons of interest (e.g., location information from a wearable monitor for persons on a suspended prison sentence or parole), additional emergency information from a governmental or other source (e.g., Integrated Public Alert and Warning System ("IPAWS" information)), real-time video or audio sources, and so forth. Supplemental information may also include data items related to characteristics, structures, objects, and so forth in the environment. Many types of supplemental data may also be associated with location/position information, such as information about the position of road hazards or a data item comprising the architectural schematic of a specific building. Such supplemental data may be filtered with respect to a particular incident and presented to a teleoperator in a map-based interface to coordinate incident response as further discussed below.

The mobile device data provider 160 may also provide supplemental data signals related to the mobile device 110 making an emergency call. The supplemental data signals may include the location of the mobile device 110, frequent or saved locations of the mobile device 110, identifying information of the mobile device 110 (e.g., telephone number, customer name), a primary language of the customer and/or mobile device 110, medical history information, car crash detection data, a time stamp, and any other information that may be useful to the emergency system 150, a telecommunicator, and/or an emergency responder. In some embodiments, the mobile device data provider 160 automatically transmits the supplemental data signals to the emergency system 150 in response to an emergency call being placed by the mobile device 110. In some embodiments, the mobile device data provider 160 transmits the supplemental data signals in response to a query from the emergency system 150.

The mobile device data provider 160 may be a web server associated with a mobile device provider. For example, the mobile device data provider 160 is operated by a mobile phone company that programs the mobile device 110 to transmit its location to the mobile device data provider 160 when a user of the mobile device 110 initiates an emergency communication (e.g., when the user places an emergency call or sends an emergency text message). As another example, a mobile device data provider 160 is operated by a software provider whose software executes on the mobile device 110 and accesses the user device's location. In still another example, the mobile device data provider 160 is implemented by the mobile device itself 110, e.g., as a software module of the mobile device 110. In this example, the mobile device 110 is programmed (e.g., by a mobile device provider or software provider) to transmit its location and/or other supplemental data directly to the emergency system 150 in response to the user initiating an emergency communication. The system environment may include multiple mobile device data providers 160 associated with different mobile device providers and/or different software providers.

During an emergency call, the mobile device data provider 160 retrieves real-time location information from the mobile device 110 and transmits the location of the mobile device 110 to the emergency system 150 in a supplemental data signal. The mobile device 110 may determine its location based on, for example, global positioning system (GPS) signals, WiFi signals, Bluetooth signals, cell towers, or other signals, or a combination of signals. The device-derived locations included in the supplemental data signals are typically more accurate and precise than the location provided in the call data, e.g., the locations based on cell towers used for routing calls. In addition, due to lags in existing call-handling infrastructure, the device-derived locations are also typically available to the emergency system 150 faster than the call data, and faster than the device-derived locations currently provided to an on-site CAD system. Furthermore, the mobile device data provider 160 can continue to provide updated locations throughout an emergency call as the mobile device 110 moves location.

In addition to mobile devices, other secondary data sources 170 provide location data and/or other data about emergencies to the emergency system 150. While the secondary data sources 170 are illustrated as being in communication with the emergency system 150, data from the secondary data sources 170 may be transmitted from the secondary data sources 170 to the emergency system 150 via additional servers or other communications networks and devices, similar to the mobile device locations being passed to the emergency system 150 by the mobile device data provider 160.

Three example types of secondary data sources are illustrated in FIG. 1. The first example secondary data source 170a represents a vehicle data source. For example, the secondary data source 170a includes a vehicle communication provider that provides the location of the vehicle and vehicle condition information (e.g., whether a crash was detected) to the emergency system 150. A vehicle connected to the vehicle communication provider may alert the vehicle communication provider to an emergency in response to a user action (e.g., a user pressing a button in the vehicle) or automatically (e.g., in response to an automatic crash detection). The second example secondary data source 170b represents a panic button data source that provides the location of a user who pressed a panic button to the emergency system 150. A panic button provider may provide additional information to the emergency system 150 describing the user (e.g., medical history information) and, if available, the type of emergency (e.g., that the user reported a fall or a home invasion). The third example secondary data source 170c is a connected security system that may include one or more of a smart doorbell, a camera, a motion sensor, a fire detector, etc. In response to a user-initiated or automatically detected emergency, a home security service that manages the connected security system may provide an address of the security system, any available real-time video, and other security data (e.g., lock tamper attempts, alarm triggers, etc.) to the emergency system 150. The emergency system 150 may receive additional or alternative secondary data signals from other types of secondary data sources besides those described herein.

The emergency system 150 may aggregate supplemental data signals received from the supplemental data sources 160 and 170 and call data received from PSAPs, such as the PSAP 140. For example, for a given call, the emergency system 150 receives call data from the EDG device 144, including the telephone number of the mobile device 110, and a supplemental data signal from the mobile device data provider 160 that includes a real-time location of the mobile device 110. By aggregating call data from the PSAPs and supplemental data signals, the emergency system 150 can provide a more detailed and effective picture of the emergencies within the jurisdiction of a given PSAP 140 than prior systems.

The emergency system 150 has access to much more data than a traditional on-premise CAD system. First, the emergency system 150 receives call data from multiple PSAPs. Call data from one PSAP may be relevant to a telecommunicator within a different PSAP, e.g., a neighboring PSAP or a PSAP with overlapping boundaries. For example, an emergency located within a first PSAP's jurisdiction may have been accidentally routed to a second neighboring PSAP, but it would be useful to a telecommunicator in the first PSAP to know about the emergency call.

In addition, the emergency system 150 receives information describing emergencies from one or more supplemental data providers. In some cases, a supplemental data signal regarding a given emergency call may arrive at the emergency system 150 sooner than the call data from a PSAP 140. For example, if a call is queued at the PSAP 140 and has not been assigned to a telecommunicator, the CHE 142 may not output any call data. In this case, the mobile device data provider 160 may provide caller information, including the location of the emergency and a phone number, to the emergency system 150 faster than the CHE 142 outputs the call data.

The emergency system 150 may also receive supplemental data signals describing emergencies for which the PSAP 140 does not receive an emergency call. For example, the mobile device data provider 160 provides locations and callback information for calls that do not get delivered to a PSAP 140 due to network outages or the call being dropped or disconnected by a user. As another example, a supplemental data provider provides data describing a mobile device 110 that attempted to text an emergency number such as "9-1-1" in a PSAP jurisdiction that does not support Text-to-9-1-1 and does not receive the text. As still another example, a supplemental data provider (e.g., a secondary data provider 170) provides information about car crashes or home burglaries for which an emergency call may not be placed. Based on information received from the supplemental data provider(s), a telecommunicator can begin routing resources to a location before even answering the call. For example, a telecommunicator may begin routing resources in response to seeing a sudden spike in calls for a particular area.

Example Emergency System

Figure 2:
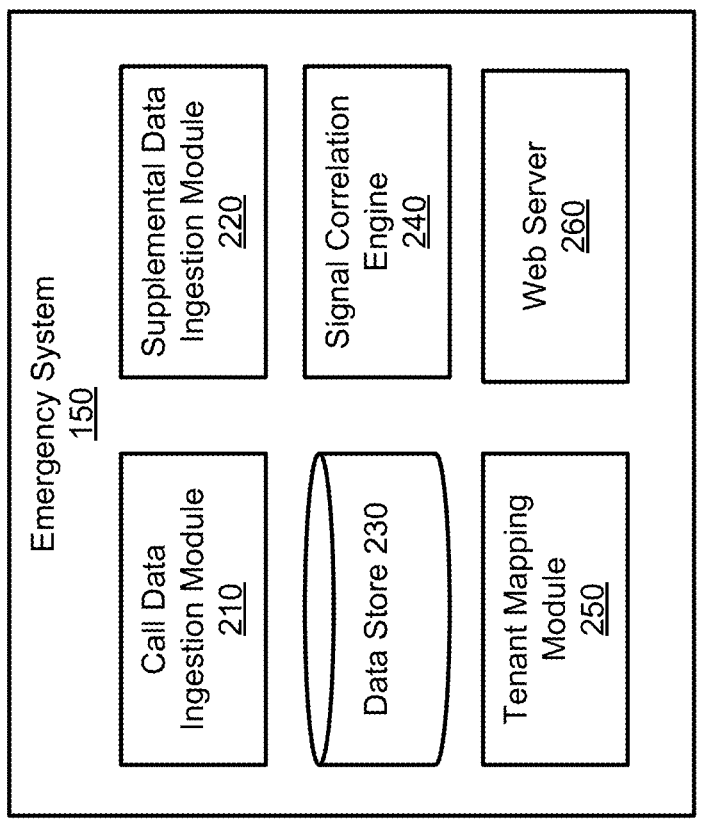
FIG. 2 is a block diagram of an emergency system, according to one embodiment.

FIG. 2 is a block diagram of the emergency system 150, according to one embodiment. The emergency system 150 includes a call data ingestion module 210, a supplemental data ingestion module 220, a data store 230, a signal correlation engine 240, a tenant mapping module 250, and a web server 260. In alternative configurations, different and/or additional components may be included in the emergency system 150. Additionally, functionality described in conjunction with one or more of the components shown in FIG. 2 may be distributed among the components in a different manner than described in conjunction with FIG. 2 in some embodiments.

In one embodiment, the emergency system 150 is a cloud-based computer-aided dispatch (CAD) system that manages a CAD service that provides information about emergency calls and first responders to telecommunicators and enables telecommunicators to connect to first responders and dispatch first responders to the locations of emergencies. The cloud-based CAD system processes call data and supplemental data signals and provides information about an emergency caller to a telecommunicator via the emergency application 150. The cloud-based CAD system may also receive information from the emergency application 148 input by the telecommunicator, e.g., additional information about a caller, selections for responding to the call, information about first responders who were dispatched, etc. In another embodiment, the emergency system 150 is an emergency call mapping interface that provides data about emergencies in a region (e.g., the jurisdiction of a PSAP 140 or a region including the jurisdiction) on a real-time map. The emergency system 150 may provide a map-based interface in which the user (e.g., the telecommunicator) may view incidents, supplemental information that may be relevant to the incident, and coordinate a response to the incident. In still another embodiment, the emergency system 150 is a call analytics system that performs analysis on received emergency calls based on the call data and supplemental data signals.

The call data ingestion module 210 receives and processes call data related to emergency calls received at PSAPs, e.g., call data received by the EDG device 144 within the PSAP 140 and transmitted to the emergency system 150. The call data ingestion module 210 may receive and process call data from other sources, such as one or more multi-tenant emergency call data relays, which may be used in combination with one or more EDG devices. In some embodiments, the EDG devices are configured to transmit data to the emergency system 150 in a common format. In other embodiments, the call data ingestion module 210 is configured to parse and reformat data received from PSAPs into a common format used by the emergency system 150. The call data ingestion module 210 may determine whether each data message describes a new call or an existing call and associates call data related to the same call. The call data ingestion module 210 outputs call data to the data store 230. In some embodiments, the call data ingestion module 210 also outputs call data to one or more processing modules (e.g., one or more of the modules 240-260) for real-time processing.

The supplemental data ingestion module 220 receives and processes supplemental data signals provided by one or more supplemental data sources separate from the source of the call data, e.g., the supplemental data sources 160 and 170a-170c shown in FIG. 1. At least some of the supplemental data signals may include a location of an emergency. The supplemental data ingestion module 220 may parse applicable supplemental data signals and reformat the parsed supplemental data signal into a common format used by the emergency system 150. The supplemental data ingestion module 220 may determine whether each supplemental data signal is related to a prior supplemental data signal (e.g., an updated location, additional camera footage, etc.) or not, and may associate related supplemental data signals to streamline processing of follow-on data signals. The supplemental data ingestion module 220 thus outputs supplemental data signals and other received supplemental data to the data store 230. In some embodiments, the supplemental data ingestion module 220 also outputs supplemental data signals to one or more processing modules (e.g., one or more of the modules 240-260) for real-time processing. The supplemental data ingestion module 220 may have a respective data interface for each supplemental data source or type of supplemental data source, e.g., based on the data format or communication protocol used by the supplemental data source. In some embodiments, each supplemental data source has a respective corresponding data ingestion module, e.g., one data ingestion module for each mobile device data provider, and one data ingestion module for each secondary data source.

The data store 230 provides storage of the call data and supplemental data signals. The data store 230 may be encrypted. In some embodiments, the emergency system 150 includes a first data store for short-term storage (e.g., for ongoing emergency calls), and a second longer-term data store accessed to perform periodic analyses. On some embodiments, the emergency system 150 includes different data stores for call data and for supplemental data signals. The data store 230 may include one or more of a Binary Large OBject (BLOB) storage service, data warehouse, key-value database, document database, relational database, or any other type of data storage.

The signal correlation engine 240 processes call data and supplemental data signals to determine whether a supplemental data signal corresponds to a particular emergency call received at a PSAP, e.g., PSAP 140. The signal correlation engine 240 may access the call data from the data store 230, or the signal correlation engine 240 may receive new call data directly from the call data ingestion module 210. Similarly, the signal correlation engine 240 may access the supplemental data signals from the data store 230, or the signal correlation engine 240 may receive new supplemental data signals directly from the call data ingestion module 210. The signal correlation engine 240 may compare a caller identifier (e.g., phone number and/or caller name) in a supplemental data signal to caller identifiers in call data related to emergency calls received at one or more PSAPs to determine whether a supplemental data signal corresponds to a particular emergency call. The signal correlation engine 240 may alternatively or additionally use other data fields to correlate a supplemental data signal to call data, such as time stamps, locations, cell carrier, etc. For example, the signal correlation engine 240 may determine that if a supplemental data signal is sufficiently close in location (e.g., within the uncertainty radiuses provided by the location sources) and sufficiently close in time (e.g., within 10 seconds) to the corresponding call data of a given emergency call, the supplemental data signal corresponds to the emergency call. The signal correlation engine 240 may use various other rules for correlating supplemental data signals to calls. In some embodiments, the rules are user-configurable.

In one embodiment, each time the supplemental data ingestion module 220 receives a supplemental data signal unrelated to a prior supplemental data signal (e.g., a supplemental data signal that is not a follow-on signal from a same device that provided a prior supplemental data signal), the signal correlation engine 240 compares caller identifiers and/or other data fields of the supplemental data signal to corresponding data field(s) of current call data to determine if the supplemental data signal matches an existing call. As the call data ingestion module 210 receives additional call data, the signal correlation engine 240 may continue to compare the supplemental data signal to incoming calls to determine if the supplemental data signal matches calls as their call data arrives at the emergency system 150.

The signal correlation engine 240 may utilize one or more filters when attempting to match supplemental data signals to call data to more efficiently correlate supplemental data signals to call data. For example, the signal correlation engine 240 may compare supplemental data signals to call data received during a similar period of time, e.g., within one minute or within five minutes. As another example, the signal correlation engine 240 may perform separate correlation processes for separate geographic regions. The boundaries of the geographic regions may have some overlap to ensure proper correlation for calls near the boundaries of the geographic regions.

The tenant mapping module 250 maps supplemental data signals to particular PSAPs for which the supplemental data signals are visible. As used herein, a tenant is a subscriber to the emergency system, such as a PSAP. A tenant may also be a group of PSAPs that are assigned to the same jurisdiction and respond to calls within the jurisdiction (e.g., a state highway patrol may include multiple PSAPs that receives calls across a highway system), or other types of emergency or governmental agencies, e.g., a statewide emergency data agency that collects and analyzes emergency data but does not respond to calls. Each tenant has an associated geographic region and may be responsible for responding to emergency calls within that geographic region. The boundaries of the geographic region are represented as a geofence or a set of geofences (referred to generally as "geofence" or "geofence data"). Geofence data may be stored in the tenant mapping module 250, in the data store 230, or in another data store. The tenant mapping module 250 compares the locations of supplemental data signals to geofence data for each PSAP to determine whether the supplemental data signals are visible to each PSAP. The tenant mapping module 250 maps a supplemental data signal to a tenant if the location indicated by the supplemental data signal falls within the geofence associated with the tenant. The tenant mapping module 250 outputs the tenant mappings to the web server 260 or to data storage accessed by the web server 260.

The web server 260 provides user interfaces to telecommunicators providing emergency response assistance. A user interface provided by the web server 260 to a telecommunicator in a given PSAP 140 includes a map that may include user interface elements relating to an incident and information to enable the telecommunicator to respond to the incident within a map-based user interface. For example, the interface may include supplemental signal indicators corresponding to the supplemental data signals mapped to the PSAP 140. Each supplemental signal indicator is positioned on the map at the location indicated by the supplemental data signal. Each supplemental signal indicator may have a visual characteristic indicating the status of a call corresponding to the supplemental signal indicator. For example, the visual characteristic may indicate whether a corresponding call has been received at the telecommunicator's PSAP, whether a corresponding call has been answered by the telecommunicator, whether a corresponding call has been answered at a different PSAP, and whether a threshold amount of time has elapsed since the call supplemental signal indicator was received without a corresponding call being answered. The web server 260 may provide additional supplemental data via the user interfaces and provide for the selection of relevant supplemental data and coordination of a response via the interface. Example user interfaces provided by the web server 260 are shown in the user interface Figures discussed below. The various user interface functions described herein as being performed by the web server 260 or by the user interface may be performed by the web server 260 (e.g., in a thin client implementation) or at the emergency application 148 based on data and instructions provided to the telecommunicator device 146 by the web server 260 (e.g., in a fat client implementation).

The web server 260 maintains information identifying each telecommunicator accessing the emergency system 150, such as a PSAP identifier and the telecommunicator's position number within the PSAP. For a given telecommunicator, the web server 260 selects data from the data store 230 or one or more other components of the emergency system 150 for display to the telecommunicator. For example, the web server 260 selects call data for calls matching the telecommunicator's PSAP identifier and position number, supplemental data signals related to the selected calls, and supplemental data signals mapped to the PSAP. The user interface may be user-configurable, and the web server 260 may select data for display based on user selections. For example, a user may request to view call data and supplemental data related to all calls currently being handled by a given PSAP, all calls within a given region, a subset of calls handled by the PSAP, data matching a particular search term, etc.

In some embodiments, the call data and supplemental data signals can be used by the emergency system 150 (e.g., a call prioritization module, not shown in FIG. 2) to automatically determine an order for telecommunicators to answer received emergency calls. For example, if the emergency system 150 identifies that multiple calls are coming from same location (e.g., within 1000 feet of each other or another location range), the emergency system 150 may lower the priority of these redundant calls after telecommunicators have already answered a threshold number of calls from that location. As another example, the emergency system 150 may assign calls to telecommunicators based on the call data and/or supplemental data signals, e.g., by assigning calls coming from the same location to the same telecommunicator or the same set of telecommunicators.

Map-Based Display for Incident Management and Dispatch

To improve interfaces and presentation of relevant information to a telecommunicator coordinating an emergency response, the emergency system provides a map-based interface for graphically viewing incident information in combination with various supplemental data along with interfaces for selecting a response for the emergency.

FIG. 3 shows an example flowchart for providing a map-based user interface for providing a response to an incident, according to one embodiment. Example map-interfaces are shown in FIGS. 4A-8B. The example of FIG. 3 shows an example process that may be used for presenting information to a user in the user interface, with several variations shown and discussed in the following Figures.

In general, the map-based interface may be used to display information about an incident, such as the location of the incident, the location of incoming calls about an incident (e.g., if different), and may determine and present additional information related to the incident (i.e., accident-specific information), and allow selection in the map-based interface of a response. When the emergency system receives the response, it may automatically apply/execute the response based on the selection in the map-based interface, without requiring the user to navigate text or command-line interfaces. The map-based interface may be presented to a user, such as a telecommunicator, on a related device, such as the telecommunicator device 146. As such, the operations performed by the emergency system 150 in relation to interfaces such as the map-based interface may refer to sending suitable information to the telecommunicator device 146 or other devices that may display the interface to the user and relay any user inputs back to the emergency system 150.

As calls are received and related incidents identified, these may be presented in the map-based interface. For example, the map-based interface can display incoming calls on the map at a location of the caller, and a telecommunicator can select a call on the map to answer the call. This enables a relatively quick and easy way for communicators to simultaneously choose which calls to answer as well as to visually identify where the incident is located and readily orient to the geography of the incident.

When the telecommunicator interacts with a specific incident in the map-based interface, emergency system may identify 300 the incident, identify 310 incident-specific information and provide 320 the incident-specific information for presentation to the user. For example, the user may select an incident, and the emergency system may contextually select supplemental information to provide to the user based on the identified incident. The supplemental information typically provides information that may be independent of and not previously associated with the incident, such as available response units, weather, other hazards, location information, and other types of supplemental information as discussed above. In this sense, the incident may be used to filter supplemental information to be presented to the user to aid in understanding how to provide a response to the incident. The particular incident-specific information and how the information is selected may vary in different embodiments as further discussed below.

In addition, the map-based interface may further enable telecommunicators to take various actions on calls they are handling. That is, the telecommunicators may select a response and when the emergency system receives the selected response 330, the emergency system may automatically apply 340 the response to the incident, for example by associating the response to the incident and by processing and/or communicating the response to relevant external systems.

As one example of the process shown in FIG. 3, the emergency system may receive a selection by the user of a particular incident that is identified as a building fire. Based on the incident location and incident type, the emergency system may filter the set of response units to identify units that are capable of responding to a fire emergency and within a threshold distance of the incident. The location of these units is retrieved and presented to the user in the map-based interface, such that the user may visually see the location of the fire in conjunction with the location of relevant, local responders in the same view. Similarly, the telecommunicator may select one or more of the units to respond to the incident. On receiving the selection of the units as a response to the incident, the emergency system may automatically apply the response, for example by sending a message to the respective units (e.g., the relevant devices operated/associated with the units) to effect dispatch of the units to the incident, e.g., by alerting the units to the incident and optionally generating and transmitting a route to the devices for reaching the incident location.

Users may interact with the map-based interface in a variety of ways to both view relevant information (e.g., the filtered supplemental information based on the incident) and various responses to the incident may be selected and applied by the user by interacting with the map-based interface. Various example interactions and interfaces with the map-based user interface for emergency response are discussed with respect to the following interface Figures.

Figure 4A:
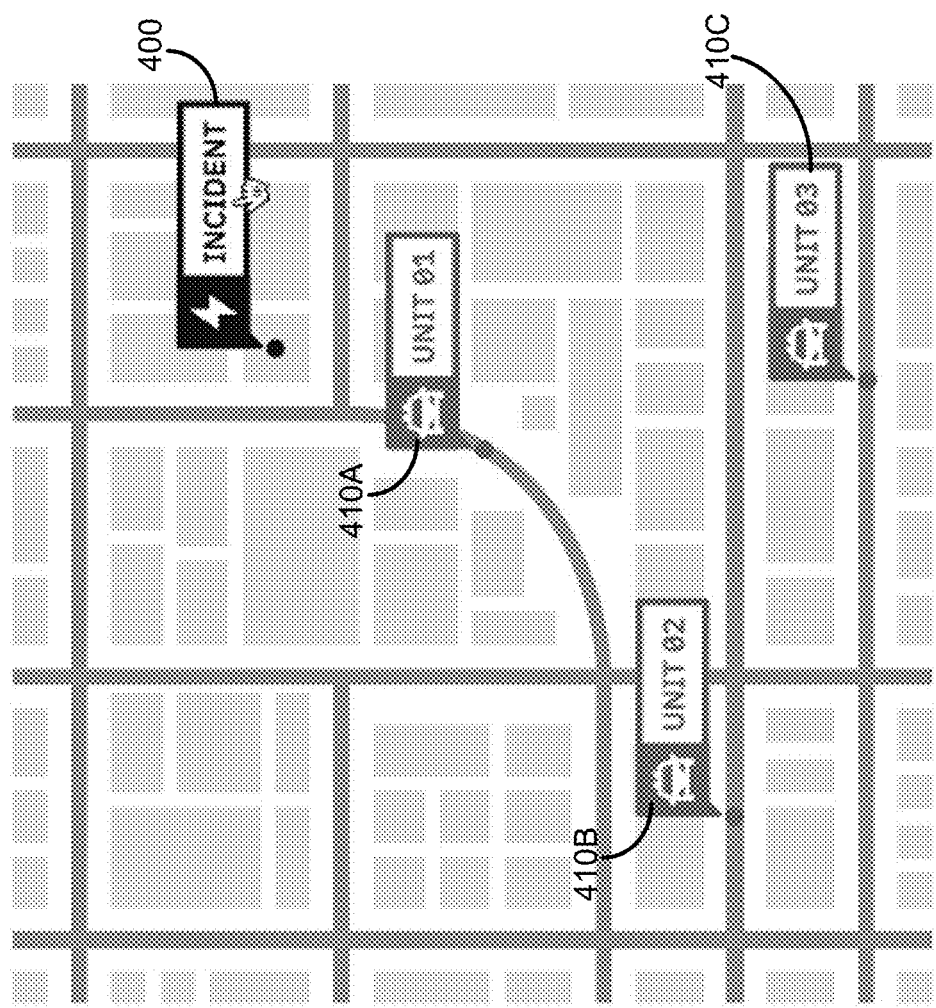
FIGS. 4A-D show example map-based interfaces displaying of unit information and selection of units as a response to an incident, according to one embodiment.

FIGS. 4A-D show example map-based interfaces displaying of unit information and selection of units as a response to an incident, according to one embodiment. FIG. 4A shows a portion of a map with an incident icon 400, represented with a lightning bolt symbol, and three unit icons 410A-C, represented with vehicle symbols. When the incident is created (e.g., when a call is answered), the incident icon 400 placed in the map to indicate the location of the incident visually. In this example, the map-based interface may automatically display the unit icons 410 in response to receiving an incident or in response to a telecommunicator taking up the incident, e.g., answering an emergency call associated with the incident, or receiving an instruction to dispatch resources to the incident. Alternatively, the map-based interface may display the unit icons in response to an input by a telecommunicator.

In this example, the CAD system identifies the three nearest units 410A-C to the incident 400 from the set of all units known to the emergency response system. In other examples, a different number of units may be provided, e.g., the five closest units, or all units within a 10-minute drive (or other configurable length of time) to the incident. That is, when the user is actively processing or determining a response to the incident 400, the emergency response system may identify the incident and filter supplemental information about units to determine those that may be selected to respond based on characteristics of the incident. For supplemental information about units, such characteristics may include the location of the incident (from which distance to the units may be determined) and the type of the incident, to determine which units may capably respond.

A precise location of the incident is shown with a dot at the lower-left of the incident icon, and a precise location of each of the units is shown with a dot at the lower-left of the unit icons 410. The unit icons 410 provide a unit number or other unit identifier. In some embodiments, the unit icon 410 may represent the type of unit, e.g., an ambulance has an ambulance icon, a fire engine has an engine icon, a fire ladder has a ladder icon, etc. Additional details (e.g., particular unit capabilities) for each unit may be displayed in response to a telecommunicator selecting a unit icon.

Figure 4B:
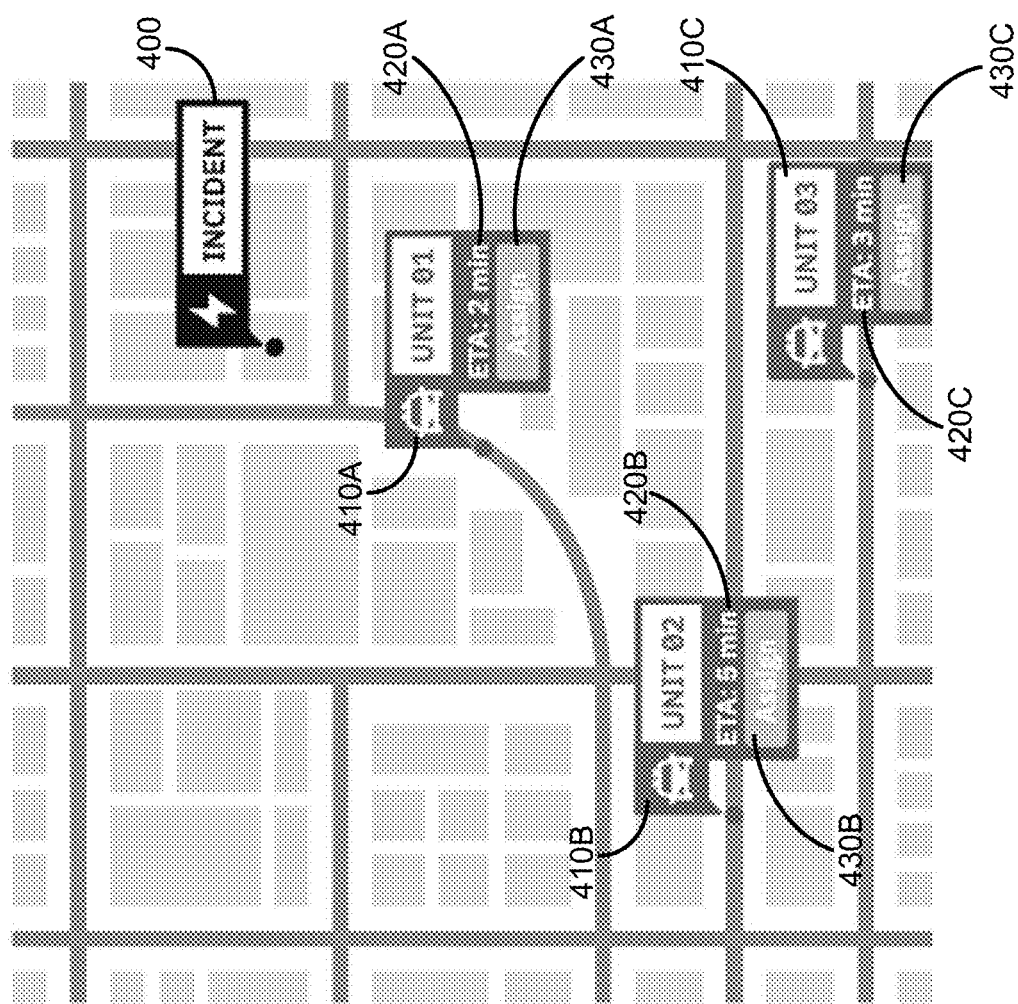

In response to a user input (e.g., the telecommunicator mousing over and selecting the incident icon 400, as shown in FIG. 4A), the map-based interface displays estimated time of arrival (ETAs) 420A-C for the displayed units 410A-C, as shown in FIG. 4B. In other examples, the map-based interface may display additional or alternative route information, such as distance from the unit to the incident, or estimated time en-route (ETE). The map-based interface also provides selectable "Assign" buttons 430A-C that the telecommunicator can select to assign a unit to the incident. As such, the supplemental information that may be filtered and presented as incident-specific information may include particular units that may effectively respond to the incident, as well as the incident-specific calculation of an ETA or ETE to the incident.

In some cases, the map-based interface may include multiple incident icons 400 representing incidents handled simultaneously by the PSAP or by the telecommunicator. The telecommunicator may select a particular incident on the map, e.g., to dispatch a unit to that incident. In response to the selection, the map-based interface displays the nearest units, optionally including the ETAs of the nearest units, as shown in FIG. 4B. When the telecommunicator selects a second incident, the map-based interface may update which units are displayed or visually distinguish the most relevant units for the second incident. The map-based interface may also update the ETAs provided for the units based on the selected incident. As such, the particular display of information about the units may be filtered or otherwise modified to present incident-specific information that varies depending on the evaluated incident.

Figure 4C:
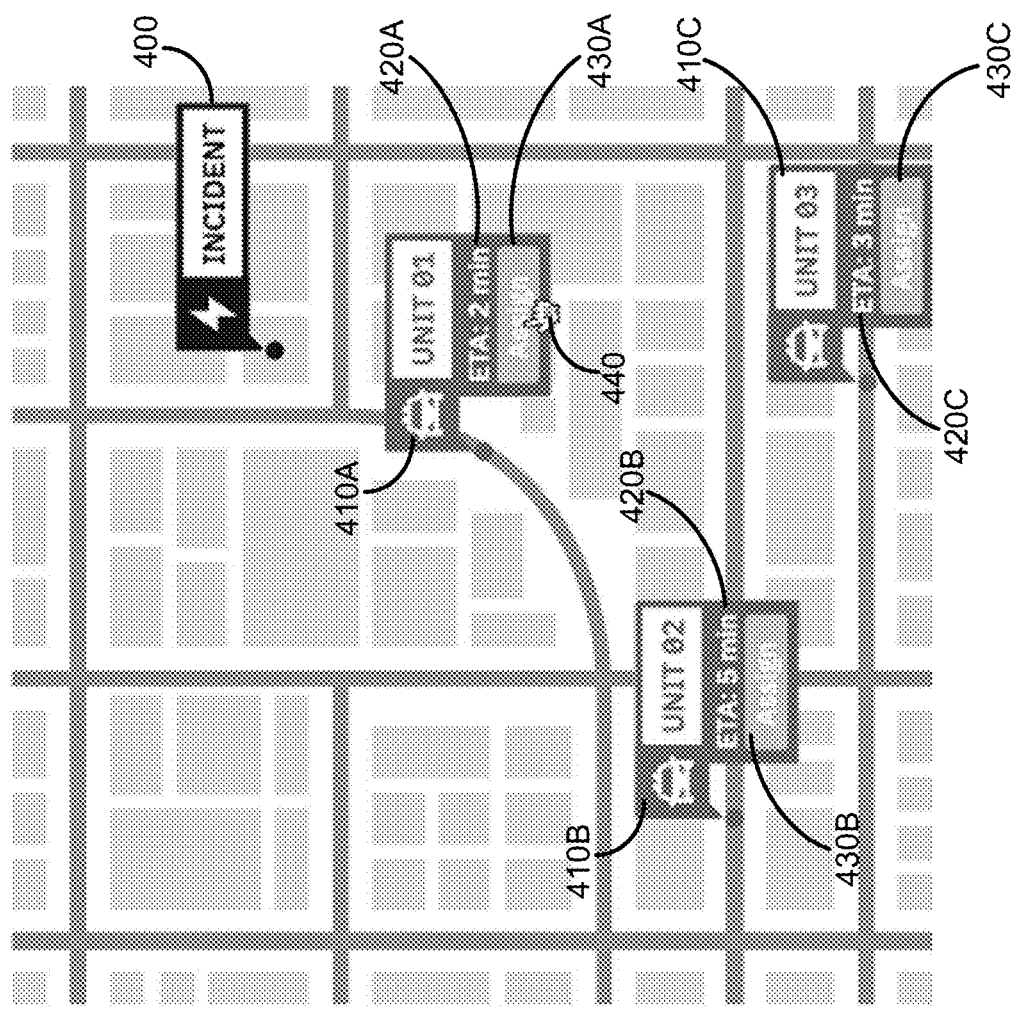
Figure 4D:
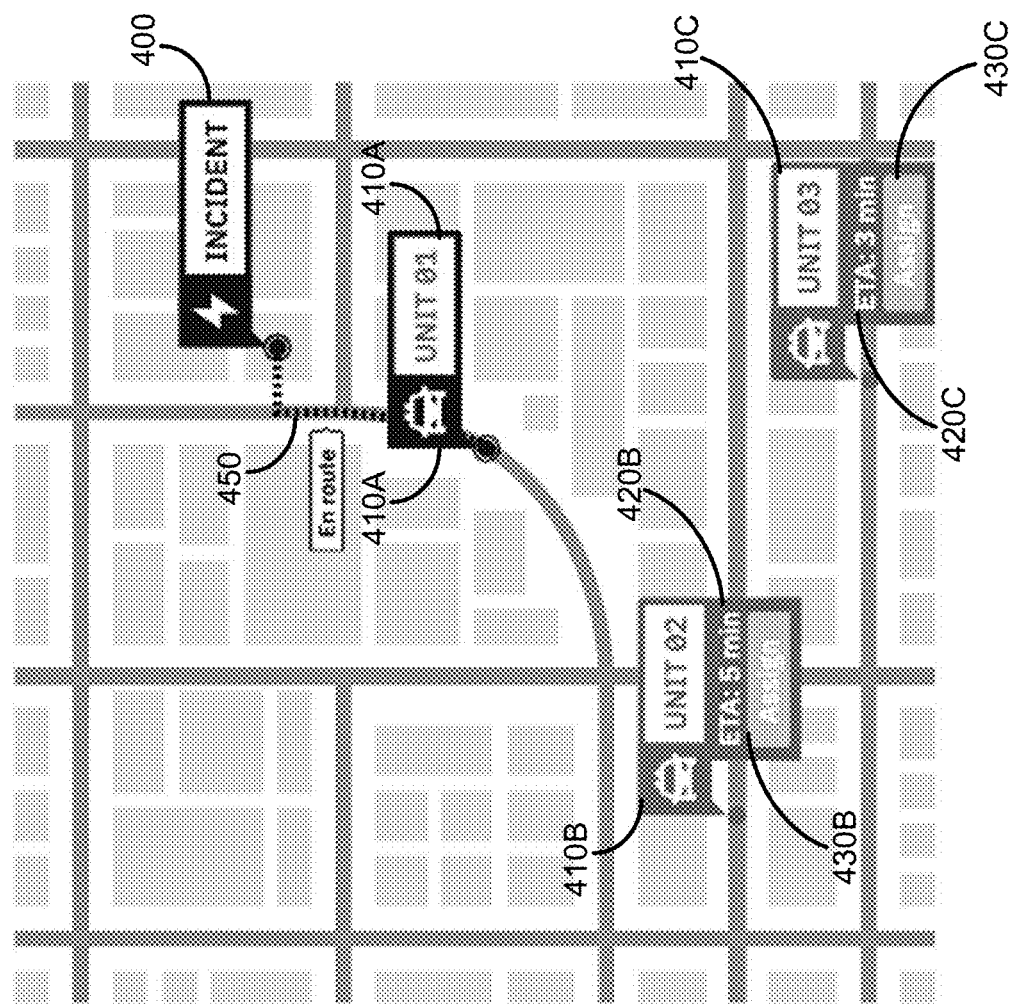

FIGS. 4C-D show an example of a telecommunicator clicking the "Assign" button 430A for Unit 01 to select it as a response to the incident. In this example, the supplemental information (e.g., the available units) may also be selected as a response; in other examples, the incident-specific supplemental information may differ from the response selected for the incident. Shown in FIG. 4C, the telecommunicator may move a cursor 440 over (e.g., to "mouse over" or "hovers" over the assign button 430A) and select it. In response to receiving this selection, the emergency system assigns the unit to the incident and dispatches the unit. The map-based interface then updates the display, as shown in FIG. 4D, to indicate that Unit 01 is en-route. The map-based interface also changes a visual characteristic of the unit icon 410A (e.g., changing the border/background color from gray to black in this example) to indicate that this unit has been assigned. In some embodiments, the map-based interface may display the route 450 to be traveled by Unit 01 while Unit 01 is en-route to the incident and may also display and update the ETA of Unit 01 as it travels to the incident.

Figure 5A:
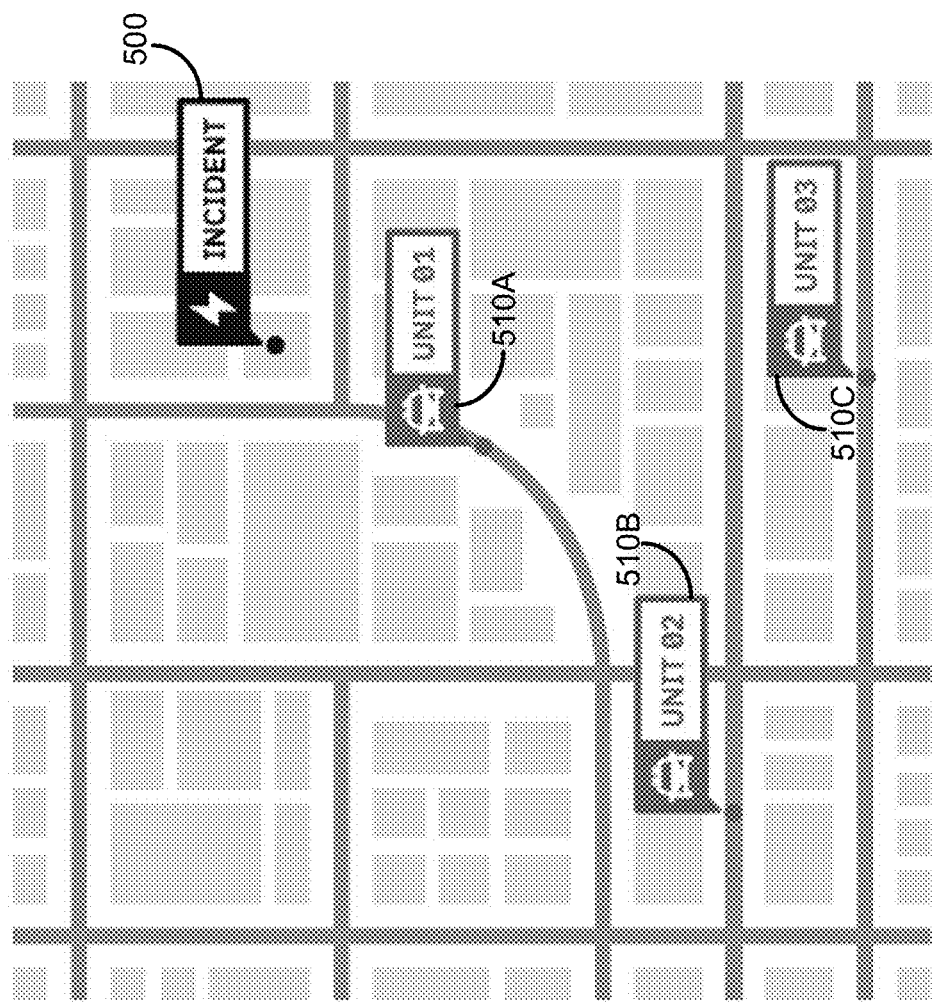
FIGS. 5A-C provide an example of selecting a response (e.g., a unit) for an incident using the map-based interface, according to one embodiment.
Figure 5B:
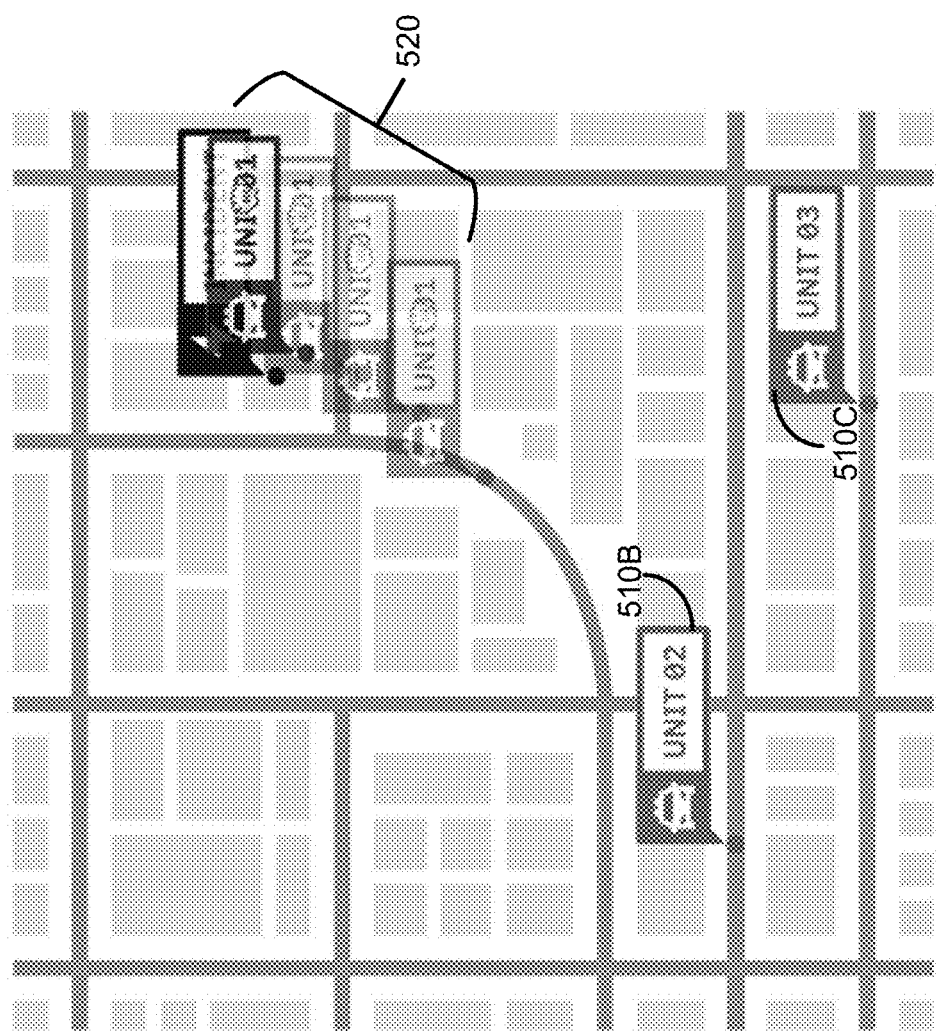
Figure 5C:
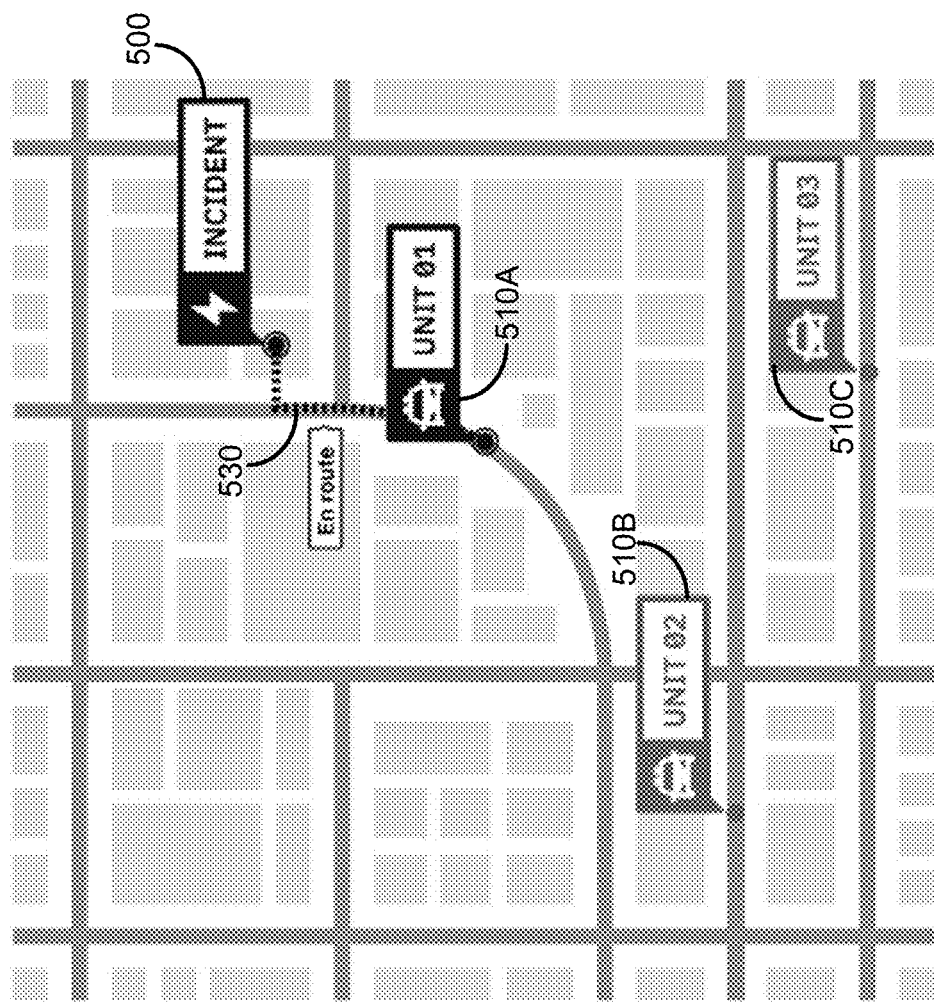

FIGS. 5A-C provide an example of selecting a response (e.g., a unit) for an incident using the map-based interface, according to one embodiment. As with FIGS. 4A, an incident 500 and units 510A-C may be displayed on the map-based interface. In this example, the map-based interface enables a telecommunicator to provide a response to an incident (e.g., dispatch unit 510A) to an incident 500 by moving icons on the interface (e.g., using a drag-and-drop process). The telecommunicator can select a unit icon, e.g., icon 510A associated with a response unit that is displayed on the map at the unit's current location, drag the unit icon 510A to an incident icon 500 (e.g., an icon associated with the incident and displayed at the location of the incident, or a call icon if there is no separate incident icon), and "drop" (e.g., release) the unit icon 510A onto or near to an incident icon 500. This interaction by a user may be referred to as a "movement" of a graphical element (e.g., an icon) to another graphical element (e.g., another icon) and may also be termed a "drag-and-drop."

FIG. 5B shows this as movement 520 in FIG. 5B to illustrate the appearance of the user interface as the unit icon 510A is moved. In FIG. 5B, the telecommunicator has moved a cursor (e.g., a mouse) over the unit icon 510A for Unit 1, selected the unit icon, and has begun dragging the unit icon towards the incident icon 500. Several past positions of the unit icon are displayed in FIG. 5B to demonstrate the motion of the unit icon, but these may not be displayed simultaneously. For example, the map-based interface may display the original position of the unit icon, possibly grayed-out, and the current position of the unit icon under control of the telecommunicator's mouse. When the unit icon is positioned on or near the incident icon (e.g., the unit icon is at least partially overlapping some portion of the incident icon), the telecommunicator drops the unit icon to assign the unit to the incident.

A visual characteristic of the incident icon 500 may change when the unit icon 510A is moved within a threshold distance of the incident icon 500 to indicate that, if the telecommunicator drops or releases the unit icon 510A, the CAD system will dispatch the unit associated with the unit icon 510A to the incident associated with the incident icon 500. In some embodiments, the map-based interface requests a dispatch confirmation, e.g., in a pop-up confirmation window, to ensure that the dispatcher intended to dispatch the unit to the incident. In response to the drag-and-drop or the confirmation, the CAD system dispatches the unit to the incident, e.g., by transmitting an instruction to one or more devices on or near the dispatched unit to drive to the incident. The map-based interface updates the display, as shown in FIG. 5C, to indicate that Unit 1 is en-route. The map-based interface may also change a visual characteristic of the unit icon (e.g., changing the border/background color from gray to black in this example) to indicate that this unit has been assigned. In some embodiments, the map-based interface may provide an updated ETA for Unit 1 while Unit 1 is en route to the incident. As shown in FIG. 5C, the unit icon 510A may be updated to indicate the unit is dispatched to the incident, and the interface may also display the route expected to be taken by Unit 01.

As such, in some embodiments, telecommunicators can designate or modify an emergency response from the map-interface itself. For example, a telecommunicator may add additional units to the response by moving (e.g., dragging-and-dropping) additional unit icons 510 to the incident icon 500. The telecommunicator may remove a unit from the incident by dragging an already-assigned unit away from the incident and, for example, moving/dropping the unit at another incident (if the unit is being rerouted) or at a home-base of the unit (e.g., a fire station).

As another example, the telecommunicator may suggest a different route for a unit based on road information provided in the map-based interface. The emergency system can receive real-time or near-real-time locations of units as they travel to incidents and provide updated locations of the units on the map. The map-based interface may further determine a route for a unit (e.g., a projected route based on a fastest or shortest path and/or typical routing patterns of the unit) and enable the telecommunicator to suggest a different route to the unit, for example by dragging-and-dropping the route. The map-based interface may display additional information, such as traffic, hazards, and other supplemental information that may interfere with a unit's route to the incident. When the map indicates that the projected route for the unit includes a closed road or a traffic delay, the telecommunicator may use that information to determine a different response by the unit by modifying its route (or suggesting a modification). The route may be modified in one embodiment by selecting a position along the route, dragging the route to a different roadway, and dropping the route onto the roadway. The different route may be considered a selection of a "response" to be implemented for the incident. The emergency system may then implement the response by automatically informing the unit of the new route, e.g., by transmitting an alert to the unit or a device in the unit (e.g., a mobile device of the driver), or by automatically updating directions of a turn-by-turn navigation tool in the unit. Similarly, the map-based interface may present route and ETA information for the selection of a different unit to respond to an incident. Examples of these route-based response selections are shown in FIGS. 6A-B and 7A-B.

Figure 6A:
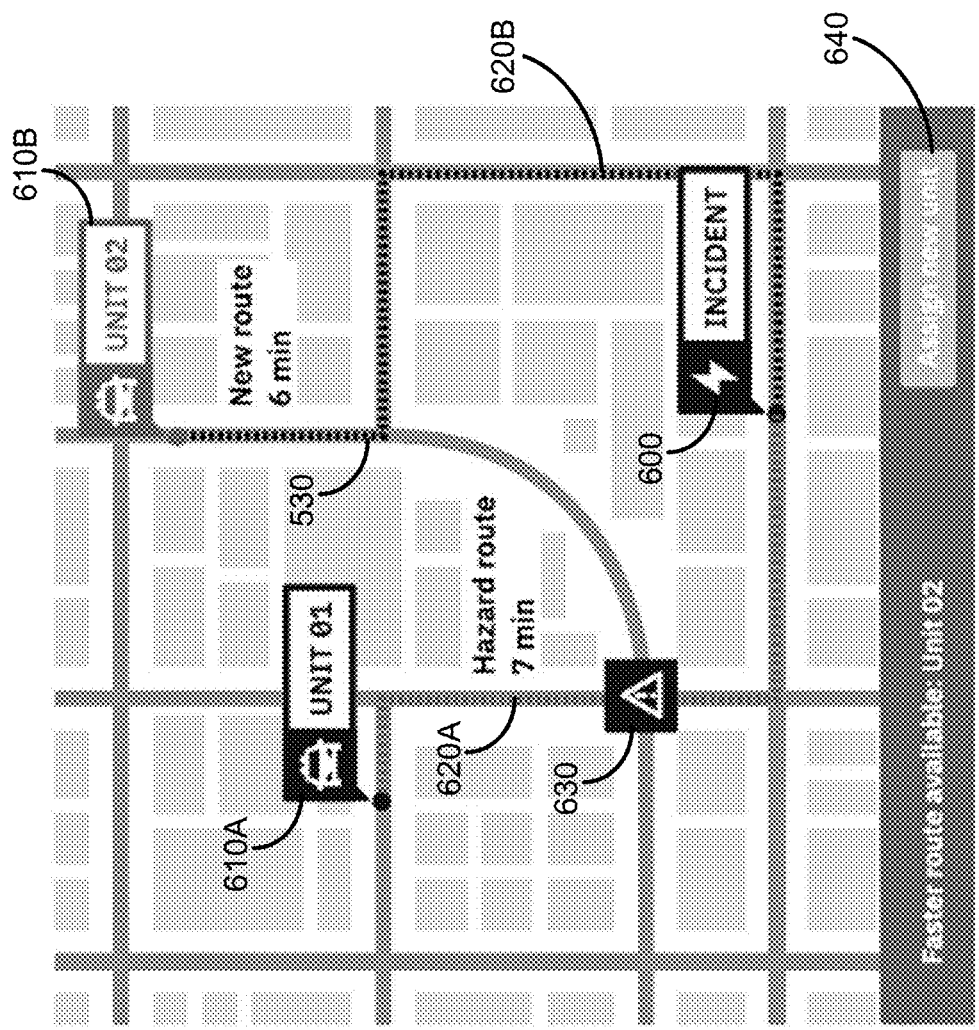
FIGS. 6A-B shows an example of a map-based interface that displays information about a unit's route and enables a telecommunicator to select a different unit to respond to an incident, according to one embodiment.
Figure 6B:
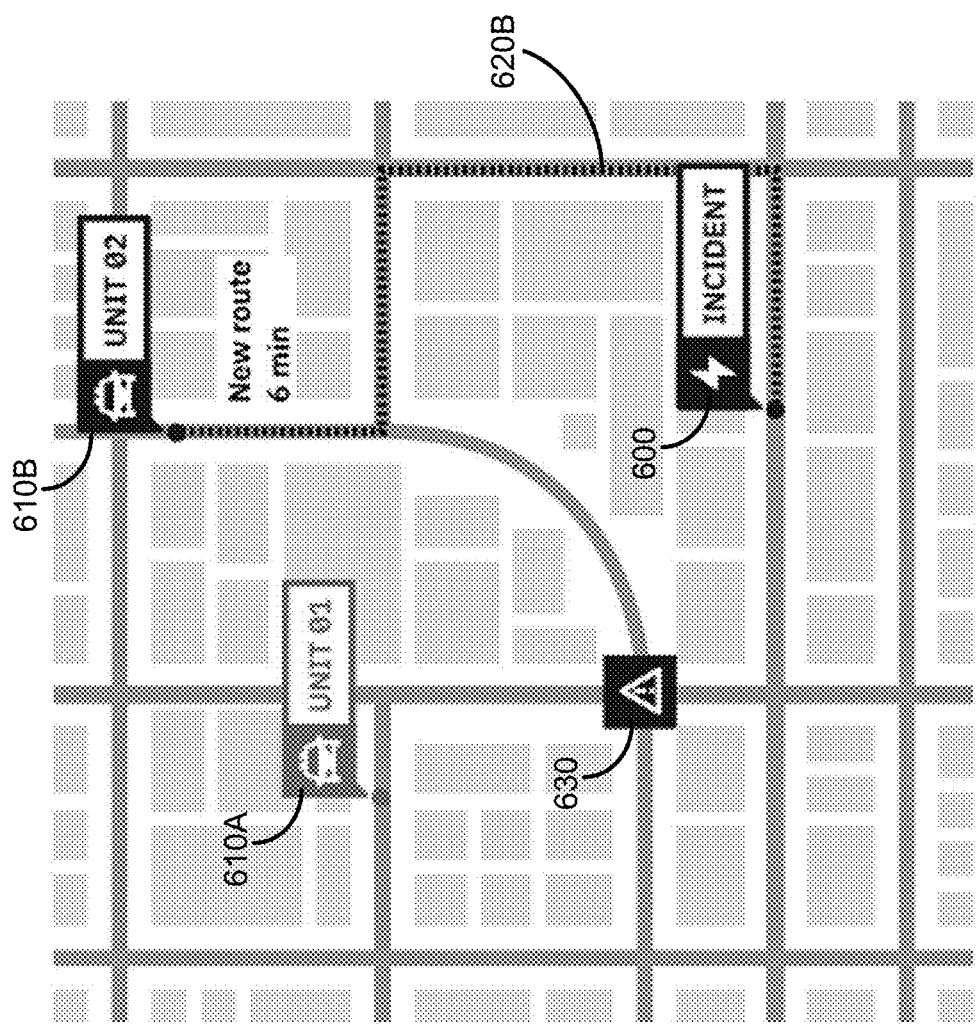

FIGS. 6A-B shows an example of a map-based interface that displays information about a unit's route and enables a telecommunicator to select a different unit to respond to an incident, according to one embodiment. In this example, the CAD system receives data (e.g., from a third-party traffic resource) describing a hazard along the expected route that Unit 1 will drive to the incident. The CAD system determines that, with the hazard, the ETA for Unit 1 is 7 minutes. The CAD system compares this ETA for the ETAs of one or more nearby units and determines that Unit 2 has a faster ETA. In FIG. 6A, the map-based interface displays the route 620A, unit icon 610A and ETA for Unit 1 to incident icon 600. In addition, the location of a hazard 630 is shown.

In addition, along the bottom of the interface, the map-based interface provides a notification that a faster route is available with Unit 2 along with a selectable button 640 for the telecommunicator to "Assign new unit," e.g., to swap Unit 1 for Unit 2, which is projected to arrive at the incident sooner. The route for Unit 2 is displayed with unit icon 610B along route 620B, allowing the teleoperator to visually view the different routes for the units, the location of the hazard 630 and more readily determine whether to select a response to change dispatched units.

FIG. 6B shows the map-based interface after the telecommunicator has selected the "Assign new unit" selectable button 640. The map-based interface has changed visual characteristics of the Unit 1 and Unit 2 icons 610A-B to indicate that Unit 2 is assigned to the incident 600. The map-based interface continues to display the ETA of Unit 2 along route 620B.

Figure 7A:
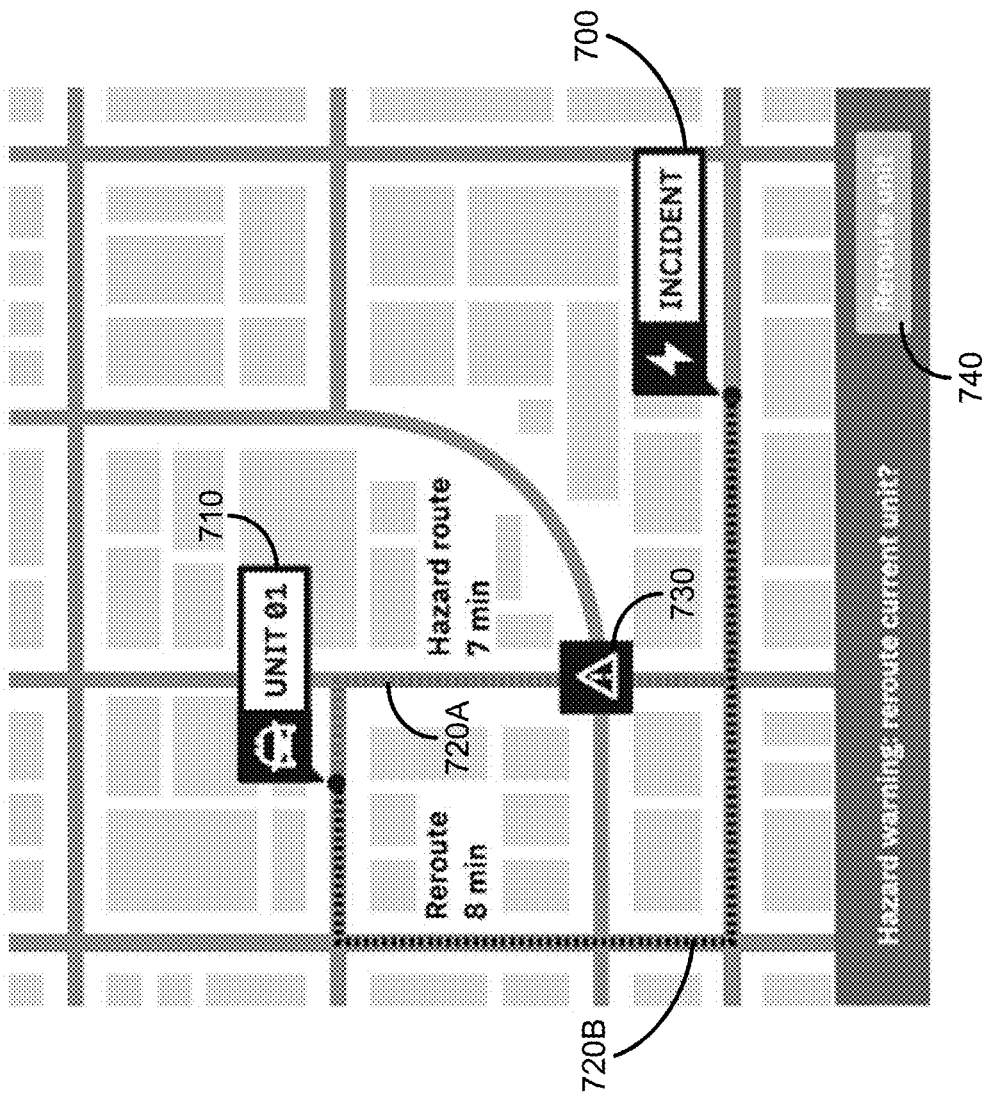
FIGS. 7A-B shows an example of a map-based interface that displays information about a unit's route and enables a telecommunicator to reroute the unit, according to one embodiment.
Figure 7B:
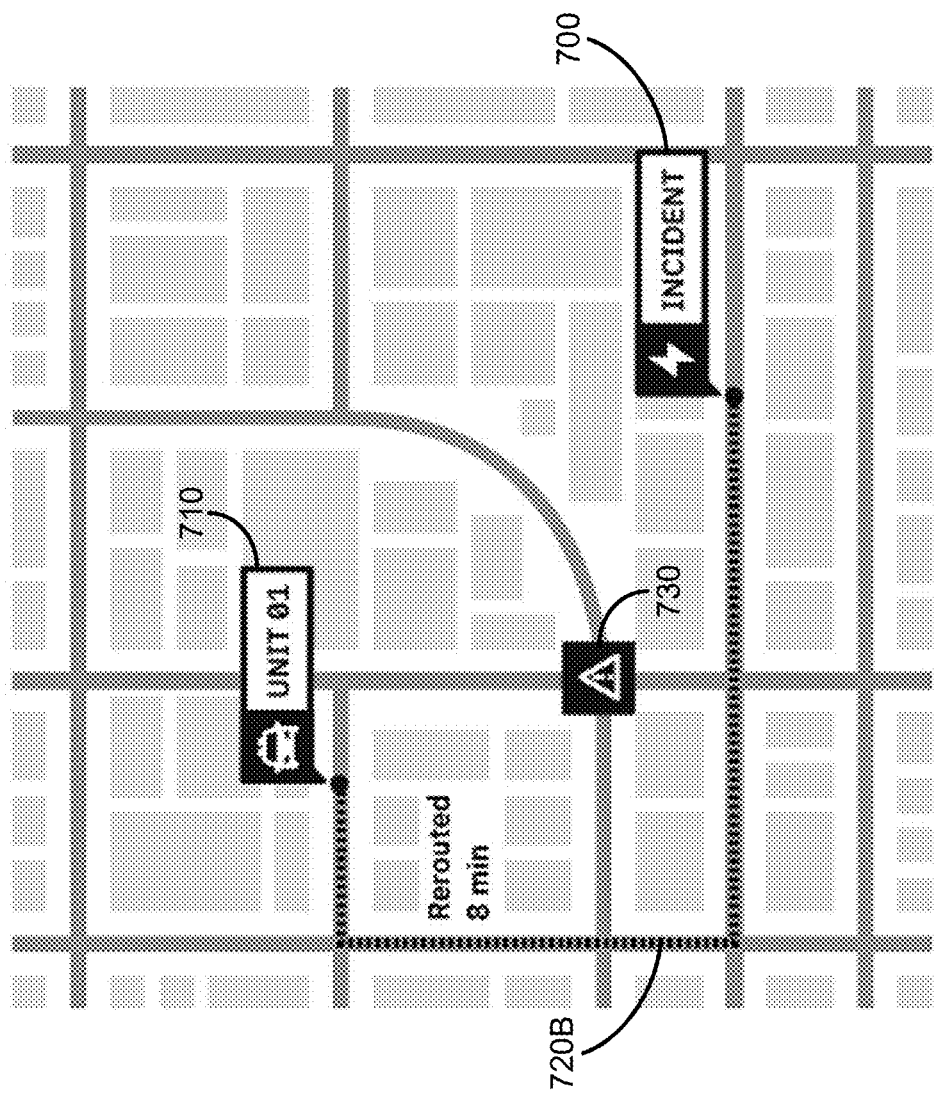

FIGS. 7A-B shows an example of a map-based interface that displays information about a unit's route and enables a telecommunicator to reroute the unit, according to one embodiment. Similar to the example of FIGS. 6A-6B, the emergency system received data describing a hazard 730 along the planned or projected route 720A to incident 700 for Unit 1, its location depicted with a unit icon 710. In this example, the CAD system determines an alternate route 720B that has a faster ETA than the hazard route 720A. In FIG. 7A, the map-based interface displays the alternate route and an ETA if Unit 1 takes the alternate route 720B. In addition, along the bottom of the interface, the map-based interface provides a notification that a hazard 730 is along the planned route along with a selectable button 740 for the telecommunicator to "Reroute unit," e.g., to instruct Unit 1 to reroute to the arrive at the incident sooner.

FIG. 7B shows the map-based interface after the telecommunicator has selected the "Reroute unit" selectable button 740. The map-based interface indicates that Unit 1 has been rerouted and displays the selected route 720B. In this example, the map-based interface continues to display the hazard 730 along the initial route, but in other embodiments, the map-based interface may remove the hazard symbol.

As described above, in some cases, calls are routed to the wrong PSAP, e.g., based on an incorrect initial location estimate. In other cases, even if a call was correctly routed, a call may be better handled by a different PSAP, e.g., if a caller is calling regarding an incident located at a different location from the caller, or if the receiving PSAP responds to certain types of calls (e.g., fire and EMS calls) and routes other types of calls (e.g., police calls) to a different PSAP that handles those types of calls. To enable easy transferring of calls, the map-based interface can enable the telecommunicator to select a call (e.g., an icon representing the call) on the map and drag-and-drop the call icon to a zone associated with a different PSAP.

Figure 8A:
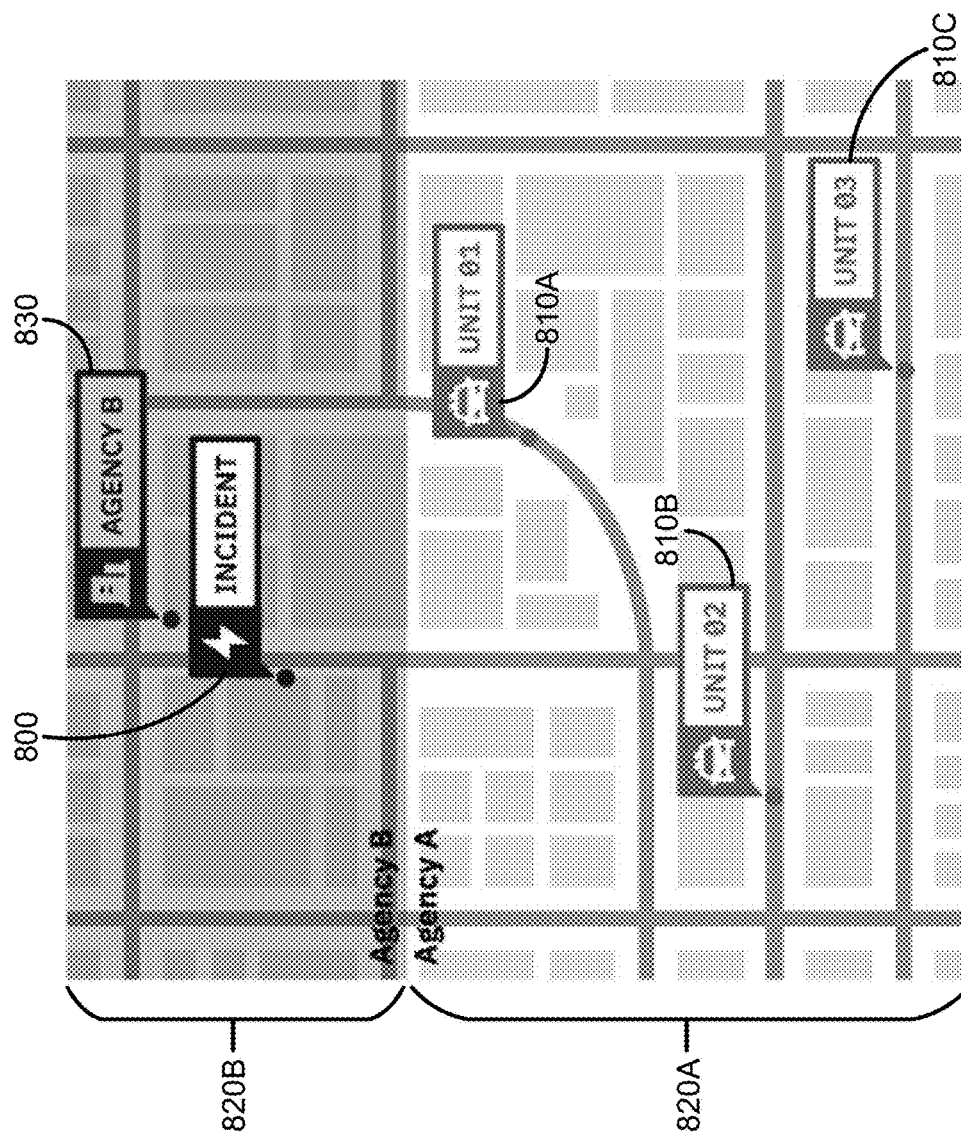
FIGS. 8A-B show an example interface for a telecommunicator to transfer an incident to another agency, according to one embodiment.
Figure 8B:
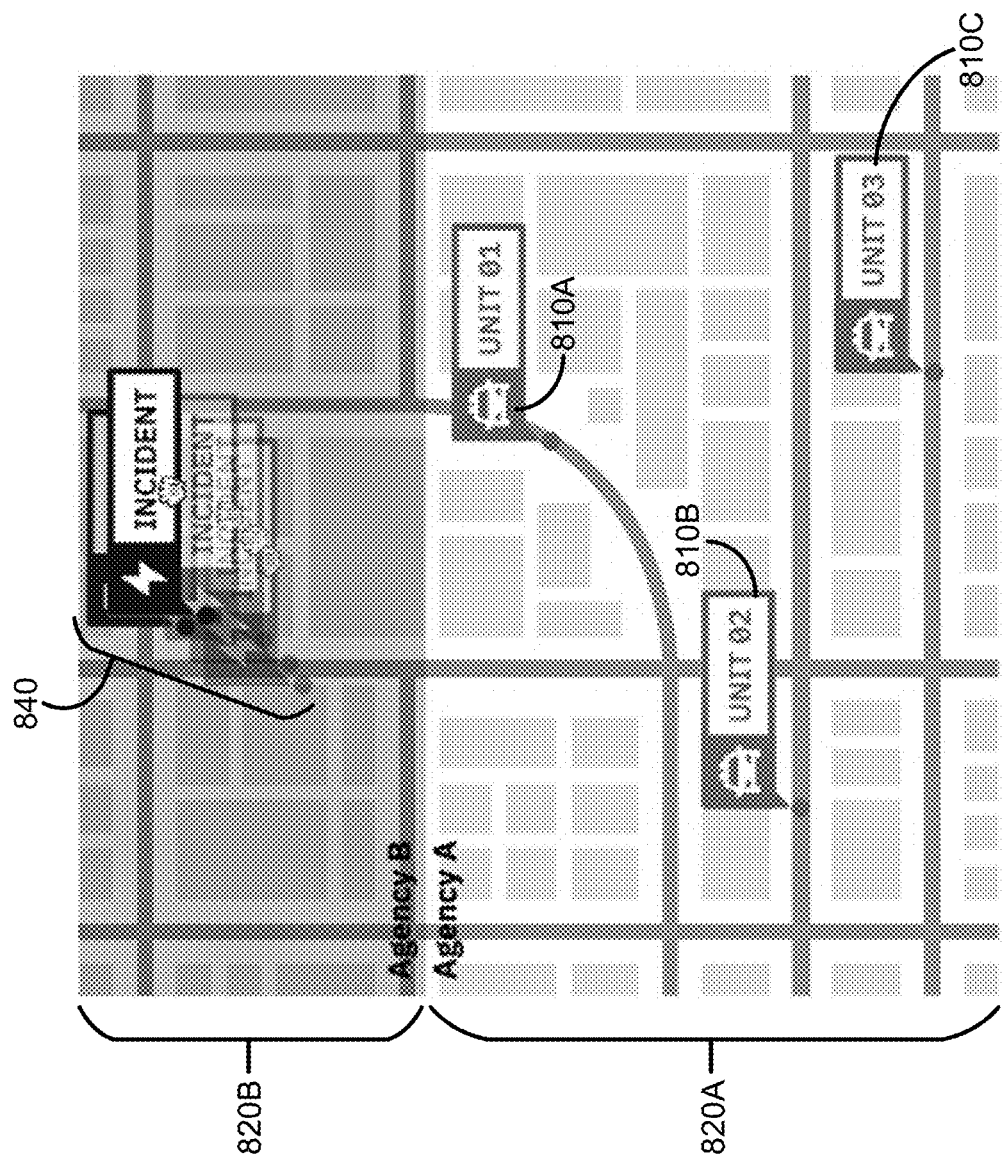

FIGS. 8A-B show an example interface for a telecommunicator to transfer an incident to another agency, according to one embodiment. The transfer to another agency may be another selection of a response for the incident. In this case, the transfer may be performed by dragging and dropping the incident icon 800 to another agency 830, e.g., a neighboring PSAP. In this example, the incident shown 800 in the map was initially routed to Agency A. The map-based interface shows the jurisdiction 820A of Agency A and the jurisdiction 820B of Agency B along with unit icons 810A-C. The map-based interface further includes an icon 830 that represents Agency B, which may be positioned at the real-world location of Agency B. A telecommunicator in Agency A can see that the incident location is within Agency B's jurisdiction 820B. As shown in FIG. 8B, the telecommunicator may select and move the incident icon 800 towards the Agency B icon. Several past positions 840 of the incident icon are displayed to demonstrate the motion of the incident icon, but these may not be displayed simultaneously. For example, the map-based interface may display the original position of the incident icon 800, possibly grayed-out, and the current position of the incident icon 800 under control of the telecommunicator's mouse.

As discussed with previous movement or "drag-and-drop" actions to designate responses or other actions, when the incident icon 800 is positioned on or near the Agency B icon (e.g., the incident icon is at least partially overlapping some portion of the Agency B icon), the telecommunicator "drops" the incident icon to transfer the incident to Agency B (i.e., select a response to the incident of transferring the incident to Agency B). In response, the CAD system transfers any calls and/or data associated with the incident to Agency B. In some embodiments, the CAD system may interface with a CPE to transfer the telephony portions of the incident (e.g., any active calls associated with the incident).

As shown in these various interfaces, the map-based interfaces may provide a variety of different types of supplemental information related to an incident and permit the user to select a variety of responses to the incident to be implemented. The supplemental information that may be presented to the user may include any information that may be relevant to the incident response, including the supplemental information discussed above. Similarly, the selection/filtering of supplemental information to provide incident-specific information on the map-based interface may be performed based on any relevant characteristics of the incident, such as its location, type, severity, etc. For example, the supplemental information filtered for the user may include traffic, hazard, personal locations, information from alert services (e.g., IPAWS), audio/video information, and so forth. As a further example, this may include audio/video sources that may be nearby the incident, such that the interface may automatically identify nearby or otherwise relevant audio/video sources for the incident.

As another example, a telecommunicator can combine multiple calls into a single incident, e.g., by dragging a first call icon to a second call icon (or an existing incident icon) and dropping the first call icon on or near the second call icon (or incident icon). A visual characteristic of the second call icon may change while the first call icon is being dragged near the second call icon and "in range" of the second call icon to indicate that, if the telecommunicator drops the second call icon, it will be combined with the first call icon. The CAD system, upon receiving the user input dragging and dropping one call icon onto another call icon, can combine the two calls into a single incident record, or associate the two calls with a single incident.

Certain information associated with incidents and other supplemental information is not specifically related to the locations of the incidents or units. The map-based interface may provide various windows, such as pop-up windows or one or more windows along the edges of the map that can display additional information to telecommunicators. For example, a telecommunicator can select an incident icon and view a window with incident details. The map-based interface may provide one or more text boxes in the window that the telecommunicator can use to type in additional incident information. The incident information may also be communicated to incident responders in a related application.

In some embodiments, certain types of information may be represented as icons that the telecommunicator can drag-and-drop to an incident to associate the information with the incident, and optionally provide the information to first responders dispatched to the incident. The association of the information with the incident in this way may also provide a type of response to the incident. For example, the map-based interface may provide icons representing building schematics, e.g., in a detail window that displays information about a building at the incident location. The telecommunicator can drag the icon representing building schematics to the incident icon. In response, the CAD system may forward a file containing the building schematics to one or more devices used by the responding units, e.g., mobile devices in the units that have been assigned to the incident. As such, the user interface may facilitate automatic file transfer to the responding users' devices based on the interaction on the user interface. This response to the emergency in the map-based interface may provide further means for consolidating information and response in a limited (e.g., one) interface window for the user.

In addition to dispatching units as a response, any suitable action or information provision may also be selected as a response to the emergency. For example, various types of data, such as relevant audio/video sources, may similarly be selected as data items and provided to responders based on interactions in the map-based interface. Like the building schematics file just discussed, an icon representing related data may be selected and moved to a responder to designate the responder to receive the related data.

As such, the interface may provide a flexible way for presenting incident-related information to an operator and improving emergency response without requiring extensive training on difficult or obtuse textual systems.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a desktop agent. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method comprising:
   identifying an incident selected by a user of an emergency dispatch system, the incident associated with an emergency call;
   automatically filtering, based on the incident, a set of response units to identify a set of filtered response units, wherein the set of filtered response units are not previously associated with the incident and are not previously associated with the emergency call;
   providing a map-based interface for display to the user of the emergency dispatch system, the map-based interface including graphical representations of at least a portion of the set of filtered response units to the user of the emergency dispatch system in the map-based interface, wherein the graphical representation of a particular response unit of the set of filtered response units is positioned in the map-based interface at a geographic location associated with the particular response unit;
   receiving, from the user of the emergency dispatch system through the map-based interface, a first selection of the particular response unit, wherein the first selection indicates a response to be applied to the incident, and wherein the first selection comprises a movement of a graphical element associated with the particular response unit to another graphical element associated with the incident;
   responsive to the first selection, (i) associating the response to be applied to the incident with the incident in the emergency dispatch system and (ii) automatically applying, by the emergency dispatch system, the response to the incident;
   receiving, from the user of the emergency dispatch system through the map-based interface, a second selection of a data item to be provided to a responder associated with the particular response unit, wherein the second selection comprises a movement of a graphical element associated with the data item to designate the graphical element associated with the particular response unit; and
   responsive to the second selection, automatically sending, by the emergency dispatch system, the data item to the responder.

2. The method of claim 1, further comprising providing, in the map-based interface, supplemental information that includes geographic information that is filtered based on a characteristic of the incident.

3. The method of claim 1, further comprising providing, in the map-based interface, supplemental information that includes hazards, dispatched units, or routes of dispatched units.

4. The method of claim 1, wherein the response comprises dispatching the particular response unit to the incident.

5. The method of claim 1, further comprising:
   receiving, through the map-based interface, a third selection of a modified route to the incident for a response unit en-route to the incident; and
   instructing the response unit en-route to the incident to navigate to the incident according to the modified route.

6. The method of claim 1, further comprising:
   receiving, through the map-based interface, a request to transfer a second incident to another user in another jurisdiction; and
   based on the transfer request, automatically transferring information associated with the second incident for presentation to the other user.

7. The method of claim 1, wherein the data item comprises an architectural schematic.

8. The method of claim 1, wherein the geographic location associated with the particular response unit comprises a current location of the particular response unit.

9. The method of claim 1, wherein the map-based interface further includes an estimated time of arrival (ETA) for the particular response unit, and wherein the ETA is also positioned in the map-based interface at the geographic location associated with the particular response unit.

10. The method of claim 1, wherein automatically applying the response to the incident comprises transmitting an instruction to the particular response unit to travel to a location of the incident.

11. A non-transitory computer-readable storage medium comprising instructions that, when executed by a processor, cause performance of a set of operations comprising:
    identifying an incident selected by a user of an emergency dispatch system, the incident associated with an emergency call;
    automatically filtering, based on the incident, a set of response units to identify a set of filtered response units, wherein the set of filtered response units are not previously associated with the incident and are not previously associated with the emergency call;
    providing a map-based interface for display to the user of the emergency dispatch system, the map-based interface including graphical representations of at least a portion of the set of filtered response units to the user of the emergency dispatch system in the map-based interface, wherein the graphical representation of a particular response unit of the set of filtered response units is positioned in the map-based interface at a geographic location associated with the particular response unit;
    receiving, from the user of the emergency dispatch system through the map-based interface, a first selection of the particular response unit, wherein the first selection indicates a response to be applied to the incident, and wherein the first selection comprises a movement of a graphical element associated with the particular response unit to another graphical element associated with the incident;

responsive to the first selection, (i) associating the response to be applied to the incident with the incident in the emergency dispatch system and (ii) automatically applying, by the emergency dispatch system, the response to the incident;

receiving, from the user of the emergency dispatch system through the map-based interface, a second selection of a data item to be provided to a responder associated with the particular response unit, wherein the second selection comprises a movement of a graphical element associated with the data item to designate the graphical element associated with the particular response unit; and responsive to the second selection, automatically sending, by the emergency dispatch system, the data item to the responder.

12. The non-transitory computer-readable storage medium of claim 11, the set of operations further comprising providing, in the map-based interface, supplemental information that includes geographic information that is filtered based on a characteristic of the incident.

13. The non-transitory computer-readable storage medium of claim 11, the set of operations further comprising providing, in the map-based interface, supplemental information that includes hazards, dispatched units, or routes of dispatched units.

14. The non-transitory computer-readable storage medium of claim 11, wherein the response comprises dispatching the particular response unit to the incident.

15. The non-transitory computer-readable storage medium of claim 11, the set of operations further comprising:

receiving, through the map-based interface, a third selection of a modified route to the incident for a response unit en-route to the incident; and instructing the response unit en-route to the incident to navigate to the incident according to the modified route.

16. The non-transitory computer-readable storage medium of claim 11, the set of operations further comprising:

receiving, through the map-based interface, a request to transfer a second incident to another user in another jurisdiction; and based on the transfer request, automatically transferring information associated with the second incident for presentation to the other user.

17. The non-transitory computer-readable storage medium of claim 11, wherein the data item comprises an architectural schematic.

18. The non-transitory computer-readable storage medium of claim 11, wherein the geographic location associated with the particular response unit comprises a current location of the particular response unit.

19. The non-transitory computer-readable storage medium of claim 11, wherein the map-based interface further includes an estimated time of arrival (ETA) for the particular response unit, and wherein the ETA is also positioned in the map-based interface at the geographic location associated with the particular response unit.

20. The non-transitory computer-readable storage medium of claim 11, wherein automatically applying the response to the incident comprises transmitting an instruction to the particular response unit to travel to a location of the incident.

21. A system, comprising:

a processor; and a non-transitory computer-readable storage medium comprising instructions that, when executed by the processor, cause performance of a set of operations comprising:

identifying an incident selected by a user of an emergency dispatch system, the incident associated with an emergency call;

automatically filtering, based on the incident, a set of response units to identify a set of filtered response units, wherein the set of filtered response units are not previously associated with the incident and are not previously associated with the emergency call;

providing a map-based interface for display to the user of the emergency dispatch system, the map-based interface including graphical representations of at least a portion of the set of filtered response units to the user of the emergency dispatch system in the map-based interface, wherein the graphical representation of a particular response unit of the set of filtered response units is positioned in the map-based interface at a geographic location associated with the particular response unit;

receiving, from the user of the emergency dispatch system through the map-based interface, a first selection of the particular response unit, wherein the first selection indicates a response to be applied to the incident, and wherein the first selection comprises a movement of a graphical element associated with the particular response unit to another graphical element associated with the incident;

responsive to the first selection, (i) associating the response to be applied to the incident with the incident in the emergency dispatch system and (ii) automatically applying, by the emergency dispatch system, the response to the incident;

receiving, from the user of the emergency dispatch system through the map-based interface, a second selection of a data item to be provided to a responder associated with the particular response unit, wherein the second selection comprises a movement of a graphical element associated with the data item to designate the graphical element associated with the particular response unit; and responsive to the second selection, automatically sending, by the emergency dispatch system, the data item to the responder.

22. The system of claim 21, the set of operations further comprising providing, in the map-based interface, supplemental information that includes geographic information that is filtered based on a characteristic of the incident.

23. The system of claim 21, the set of operations further comprising providing, in the map-based interface, supplemental information that includes hazards, dispatched units, or routes of dispatched units.

24. The system claim 21, wherein the response comprises dispatching the particular response unit to the incident.

25. The system of claim 21, the set of operations further comprising:

receiving, through the map-based interface, a third selection of a modified route to the incident for a response unit en-route to the incident; and instructing the response unit en-route to the incident to navigate to the incident according to the modified route.

26. The system of claim 21, the set of operations further comprising:

receiving, through the map-based interface, a request to transfer a second incident to another user in another jurisdiction; and based on the transfer request, automatically transferring information associated with the second incident for presentation to the other user.

27. The system of claim 21, wherein the data item comprises an architectural schematic.

28. The system of claim 21, wherein the geographic location associated with the particular response unit comprises a current location of the particular response unit.

29. The system of claim 21, wherein the map-based interface further includes an estimated time of arrival (ETA) for the particular response unit, and wherein the ETA is also positioned in the map-based interface at the geographic location associated with the particular response unit.

30. The system of claim 21, wherein automatically applying the response to the incident comprises transmitting an instruction to the particular response unit to travel to a location of the incident.

\* \* \* \* \*